(12) United States Patent
Tashiro et al.

(10) Patent No.: US 6,470,252 B2
(45) Date of Patent: Oct. 22, 2002

(54) INTEGRATED VEHICLE CONTROL SYSTEM HAVING MANAGER ECU

(75) Inventors: Tsutomu Tashiro, Nagoya (JP); Takehito Fujii, kariya (JP); Noboru Miyamoto, Kariya (JP); Yoshifumi Kato, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/878,367

(22) Filed: Jun. 12, 2001

(65) Prior Publication Data

US 2001/0056318 A1 Dec. 27, 2001

(30) Foreign Application Priority Data

Jun. 22, 2000 (JP) .......................................... 2000-187745
Apr. 17, 2001 (JP) .......................................... 2001-118182

(51) Int. Cl.[7] .............................................. B60K 41/04
(52) U.S. Cl. .............................. 701/51; 701/54; 701/57; 701/48; 477/34; 477/107
(58) Field of Search .............................. 701/48, 51, 54, 701/57, 33, 36; 477/15, 17, 34, 110, 115, 107; 700/45

(56) References Cited

U.S. PATENT DOCUMENTS

| 5,351,776 A | 10/1994 | Keller et al. ................ 180/79.1 |
| 6,026,342 A | * 2/2000 | Graf et al. ..................... 701/51 |
| 6,154,688 A | 11/2000 | Dominke et al. ............... 701/1 |

FOREIGN PATENT DOCUMENTS

| JP | 7-108882 | 4/1995 |
| JP | 7-135686 | 5/1995 |

* cited by examiner

Primary Examiner—Yonel Beaulieu
Assistant Examiner—Arthur D. Donnelly
(74) Attorney, Agent, or Firm—Nixon & Vanderhye P.C.

(57) ABSTRACT

An integrated vehicle control system for integratedly controlling a vehicle drive system transmits a control command from a manager ECU to an engine ECU and an AT ECU. The manager ECU receives characteristic information of an engine and an AT from the engine ECU and the AT ECU. The control commands are set on the basis of the characteristic information. Further, the engine ECU and the AT ECU are provided with a plurality of control rules corresponding to different tuning patterns. The manager ECU retrieves realizable tuning patterns from these ECUs, and selects the optimum tuning pattern corresponding to a use of a vehicle.

27 Claims, 17 Drawing Sheets

TRANSMISSION INPUT SPEED/ENGINE SPEED

| SHIFT | UNACCEPTABLE SHIFT STAGE |
|---|---|
| 1→2 | NONE |
| 2→3 | NONE |
| 3→4 | 1 |
| 1→3 | 2 |
| 2→4 | 1 |

| SHIFT | UNACCEPTABLE SHIFT STAGE | | |
|---|---|---|---|
| | IN DEAD-TIME | DURING SHIFT | AFTER SHIFT |
| 1→2 | 1,3,4 | NONE | 1,4 |
| 2→3 | 1,2 | 4 | 2 |
| 3→4 | 1,2,3 | NONE | 1,3 |
| 1→3 | 1,2 | 4 | 1 |
| 2→4 | 1,2,3 | NONE | 2 |

FIG. 10

DEAD-TIME IN 4 → 3 SHIFT

| SPEED [km/h] \ TORQUE [Nm] | -40 | -20 | 0 | 20 | 100 |
|---|---|---|---|---|---|
| 20 | 800 | 700 | 600 | 550 | 500 |
| 40 | 1200 | 1000 | 900 | 800 | 700 |
| 100 | 1600 | 1300 | 1150 | 1050 | 1000 |

[msec.]

FIG. 11A

GRADIENT

| SPEED [km/h] \ SHIFT | 1→2 | 2→3 | 3→4 | 1→3 | 2→4 |
|---|---|---|---|---|---|
| 0 | 0 | 0 | 0 | 0 | 0 |
| 10 | 1500~2000 | 1400~1800 | 1100~1500 | 3100~3400 | 2900~3200 |
| 20 | 2200~2600 | 1400~1800 | 1100~1500 | 3100~3400 | 2900~3200 |
| 30 | 2800~3200 | 1700~2000 | 1250~1500 | 4800~5000 | 4400~4600 |
| 40 | 4650~5000 | 2200~2450 | 1700~2000 | 6100~6250 | 5700~5900 |
| 50 | 5900~6200 | 2600~2800 | 2100~2350 | 7500~7650 | 7000~7150 |

[r.p.m./sec.]

FIG. 11B

TARGET GRADIENT

| SPEED [km/h] \ SHIFT | 1→2 | 2→3 | 3→4 | 1→3 | 2→4 |
|---|---|---|---|---|---|
| 0 | 0 | 0 | 0 | 0 | 0 |
| 10 | 1800 | 1500 | 1300 | 3200 | 3000 |
| 20 | 2400 | 1500 | 1300 | 3200 | 3000 |
| 30 | 3080 | 1900 | 1400 | 4900 | 4500 |
| 40 | 4800 | 2300 | 1800 | 6200 | 5800 |
| 50 | 6000 | 2700 | 2200 | 7500 | 7000 |

[r.p.m./sec.]

INTEGRATED VEHICLE CONTROL SYSTEM HAVING MANAGER ECU

CROSS REFERENCE TO RELATED APPLICATION

This application is based on and incorporates herein by reference Japanese Patent Applications No. 2000-187745 filed Jun. 22, 2000 and No. 2001-118182 filed Apr. 17, 2001.

BACKGROUND OF THE INVENTION

The present invention relates to an integrated vehicle control system for integratedly controlling a plurality of components such as an engine or an automatic transmission mounted on a vehicle.

In recent years, for controlling a plurality of components mounted on a vehicle, an integrated control system is proposed to restrain an increase in the integrated system development time.

For example, JP-A-7-108882 proposes that a control system includes a power train control operation unit, an injection control device, an ignition control device, a signal input/output processing unit, a transmission control device, a throttle control device and the like, by dividing a power train control system of a vehicle into respective functions. The devices except the power train control operation unit are operated by commands from the power train control operation unit via communication lines by connecting between these respective devices with the communication lines. Portions relating to a design specification change of the control system such as sensors and actuators are devised to be concentrated in the input/output processing unit.

Further, U.S. Pat. No. 5,351,776 (JP-A-5-85228) proposes to realize the optimum control over an entire vehicle by arranging control elements for carrying out control subjects such as an engine output, driving force, braking force and control elements for controlling driving characteristics of a vehicle in a form of a hierarchical level structure, and by supplying required characteristics in order from a high hierarchical level to a low hierarchical level.

In either of these integrated control systems, shortening of the development time is realized in such a manner that control systems of a vehicle are separated into a plurality of pieces with a view to shortening the development time required for a design change by lessening the number of control elements of control systems to be changed in a design as a specification change of the system, or that the parallel developments of individual control elements are capable of conducting by maintaining independent properties of respective control elements.

However, a sufficient reduction effect in the development time cannot be obtained by merely separating the control systems. That is, when the control systems are separated into a plurality of control elements, without setting sharing information appropriately among the respective control elements, a reduction effect in the development time cannot sufficiently be obtained.

SUMMARY OF THE INVENTION

It is an object of the present invention to realize sufficient shortening of development time for an entire system, and to attain optimum control performance.

An integrated vehicle control system comprises a plurality of component control sections and a manager control section. The component control sections respectively control operations of a plurality of components of a vehicle such as an engine and an automatic transmission following previously set control rules. The manager control section commands operational guides of the components to the component control sections. Each of the component control sections transmits a characteristic information of the components to the manager control section. The manager control section sets the operational guides of the components based on the transmitted characteristic information of the components.

The characteristic information of the engine includes at least one of a generating drive power (torque) characteristic, a fuel consumption characteristic and an emission characteristic of the axle drive source. The characteristic information of the automatic transmission includes at least one of a transmission characteristic, a shift prohibition/permission characteristic and a shift quality characteristic of the transmission.

BRIEF DESCRIPTION OF THE DRAWINGS

The above and other objects, features and advantages of the present invention will become more apparent from the following detailed description made with reference to the accompanying drawings. In the drawings:

FIG. 10 is a table illustrating an example of required shift time information and shift dead-time information;

FIG. 11A and 11B are tables illustrating rotating speed gradient information of a transmission input shaft and a target rotating speed gradient characteristic of a transmission input shaft;

DETAILED DESCRIPTION OF THE PREFERRED EMBODIMENT

Figure 1:
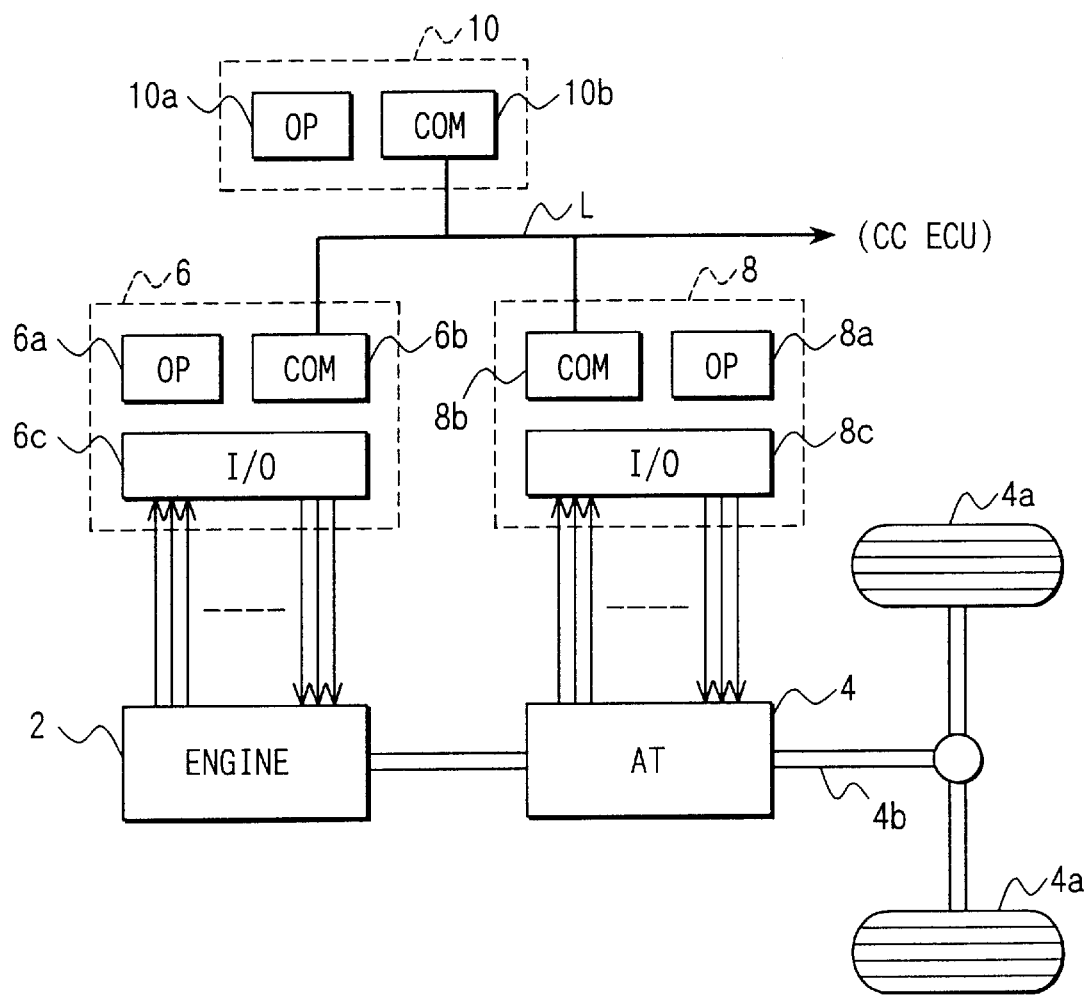
FIG. 1 is a block diagram illustrating a power train control system according to an embodiment of the present invention.

An integrated vehicle control system is shown in FIG. 1. This system is a power train control system for integratedly controlling an engine 2 and an automatic transmission (AT) 4 being components of a vehicle drive system. The AT 4 is connected to drive wheels 4a through an axle 4b. As component control sections of the integrated control system, an engine ECU 6 and an AT ECU 8 are provided in order to respectively control the engine 2 and the AT 4. Further, as a manager control section of the integrated control system, a manager ECU 10 is provided for commanding operational guide the engine ECU 6 and the AT ECU 8 for the engine 2 and the AT 4. The engine 2 is an axle drive source, and the engine ECU 6 is an axle drive source control section. Further, the AT 4 is a transmission, and the AT ECU 8 is a transmission control section.

The ECUs 6, 8 and 10 are electronic control units independently constituted by setting operation processing sections 6a, 8a and 10a constituted of microcomputers. Further, these respective ECU 6, 8 and 10 has respective communication sections 6b, 8b and 10b connected to each other via communication line L for data communication. Data are transmitted to each other in order to control the power train via these respective communication sections 6b, 8b, 10b and the communication line L.

The engine ECU 6 and the AT ECU 8 are for the purpose of controlling the engine 2 and the AT 4. The ECUs 6 and 8 receive detection signals from all sorts of sensors for detecting the states of the engine 2 and the AT 4. The ECUs 6 and 8 have respective signal input/output sections 6c and 8c for outputting drive signals to all sorts of actuators provided in the engine 2 and the AT 4.

A signal input/output section 6c of the engine ECU 6 is connected with sensors, switches and the like such as position sensor of an accelerator pedal for detecting a pedal position of the accelerator pedal by a driver, an airflow meter for detecting a flow rate (intake air quantity) of intake air, an intake air temperature sensor for detecting a temperature of intake air, a throttle opening degree sensor for detecting an opening degree of a throttle valve, an oxygen concentration sensor for detecting an oxygen concentration in exhausting gas, a knocking sensor for detecting the knocking, a water temperature sensor for detecting a cooling water temperature, a crank angle sensor for detecting a rotational angle of a crankshaft and a rotating speed thereof, and an ignition switch. It is also connected with all sorts of actuators for an engine control such as an injector provided for every cylinder of the engine 2, an igniter for generating a high voltage for the ignition, a fuel pump for feeding fuel pumped up from a fuel tank to injectors, and a throttle drive motor for opening/closing the throttle valve provided in an intake pipe of the engine 2.

The signal input/output section 8c of the AT ECU 8 is connected with the sensors, switches and the like such as rotating speed sensor for detecting a rotating speed of an input shaft to the transmission from a torque converter constituting the AT 4, a vehicle speed sensor for detecting a vehicle speed from a revolution of a vehicle drive shaft connected to an output shaft of the AT 4, an oil temperature sensor for detecting the temperature of a hydraulic fluid at the AT 4 side, a shift position switch for detecting an operating position (shift position) of a shift lever which a driver operates, and a stop light switch for detecting a state (brake operation of driver) of a stop light for lighting by a brake operation of a driver. It is also connected with all sorts of actuators for an AT control such as a shift solenoid for switching shifting stages, a line pressure solenoid for operating engaging force of a shift clutch, and a lock up pressure solenoid for operating fastening force of a lockup clutch for fastening an input/output shaft of the torque converter.

The communication line L is connected with a CC ECU (not illustrated) for performing a traveling control (cruising control: CC) in order to follow a preceding vehicle while making a vehicle travel at a constant speed, or controlling inter vehicular distance between the own vehicle and the preceding vehicle. The CC ECU transmits a CC flag for representing an ON/OFF (execution/stoppage of traveling control) of the CC and a target acceleration/deceleration (CC target acceleration/deceleration) of a vehicle required for realizing a control via the communication line with respect to the manager ECU 10.

Figure 2:
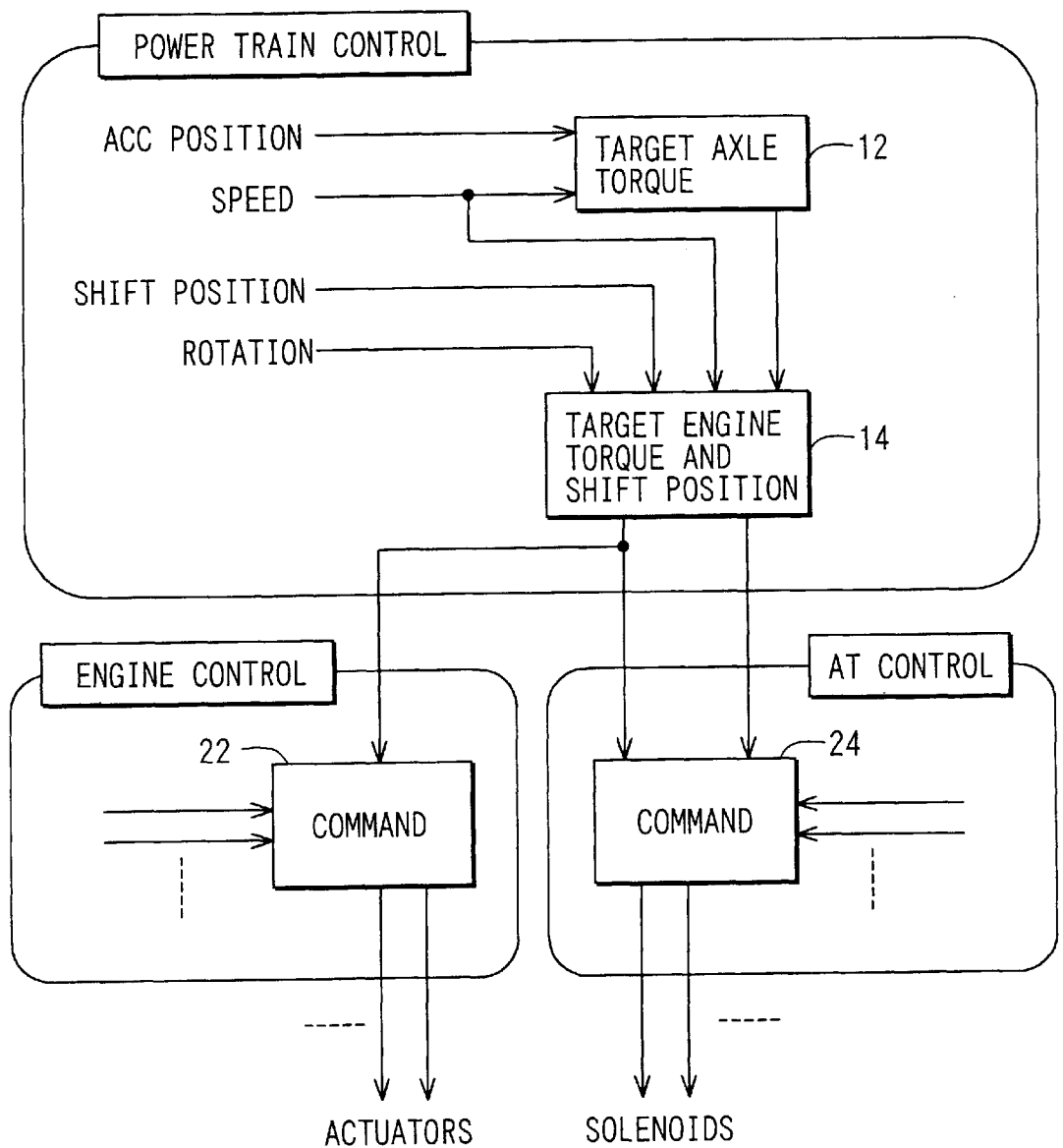
FIG. 2 is an explanatory diagram illustrating control processing with function blocks which is carried out for the purpose of a vehicle control by respective ECU constituting the power train control system shown in FIG. 1.

In the respective ECUs 6, 8 and 10, operation processing sections 6a, 8a and 10a respectively follow control programs stored in memories in advance, and carry out control processing (engine control processing, AT control processing and power train control processing) for controlling the engine 2, the AT 4, and the entire system. FIG. 2 is a block diagram illustrating the control processing in function block form carried out in the respective ECU 6, 8 and 10.

As illustrated in FIG. 2, the power train control processing carried out in the manager ECU 10 sets a target axle torque to specify a behavior of a power train on the basis of the position of the acceleration pedal representing a request of a driver for the acceleration/deceleration of a vehicle and the vehicle speed or the like representing an actual traveling state of a vehicle by a setting section 12 of target axle torque. An engine torque and shift stage (gear position) setting section 14 calculates a target engine torque and a target shift stage which are the optimum to realize the target axle torque on the basis of the shift position and engine rotating speed.

Here, respective parameters such as the position of the accelerator pedal, the vehicle speed, the engine rotating speed and the shift position utilized for setting respective target values described above by the setting sections 12 and 14 are the parameters transmitted from the engine ECU 6 or the AT 8 via the communication line L.

The setting section 14 sets an engine operating point desirable to realize the target axle torque according to a set of control rules in consideration of the will of a driver estimated from the shift position, over-speed prevention, a fuel economy of the engine 2, emission, a combustion stability or the like. The target shift stage and the target engine torque are set accordingly.

The control rules for setting respective target values by the setting section 12 are specified by maps or operational expressions stored in the memory in advance. When actually setting these respective target values, these maps or the operational expressions are utilized.

At setting section 14, specified frames of the map and the operational expressions are defined in advance. Numerals of the maps are filled with characteristic information retrieved from the engine ECU 6 and the AT ECU 8, and the target shift stage and the target engine torque are calculated by these maps or the operational expressions.

The target engine torque set by the setting section is respectively transmitted to the engine ECU 6, and the AT ECU 8. The target shift stage is transmitted to the AT ECU 8.

The engine control processing is carried out on the side of the engine ECU 6, by an actuator command setting section 22 in a process of setting the throttle opening degree, a fuel injection quantity, and the ignition timing required for realizing the target engine torque with a target air-fuel ratio set previously on the basis of the information (that is, target engine torque) for representing the operational guide of the engine 2 transmitted from the manager ECU 10 and the detection signals from the sensors, the switches, and the like, thereby producing command values (drive signals) for driving the injector, the igniter, the fuel injection pump, and the throttle drive motor, and outputting these command values to respective actuators.

The AT control processing on the side of the AT ECU 8 is carried out by a solenoid command value setting section 24 in a process of producing the command values (drive signals) for driving a shift stage switching solenoid for realizing the target shift stage in a case where the target shift stage is different from the present shift stage, on the basis of the information (that is, target shift stage) for representing the operational guide lines of the AT 4 transmitted from the manager ECU 10, the target engine torque transmitted from the manager ECU 10, and the detection signals from the sensors, the switches and the like described above, outputting the command value to the shift stage switching solenoid, and at the same time, by calculating a line pressure command value according to the target engine torque as the engaging force of a clutch relating to the shifting, producing the command value (drive signal) for driving the line pressure solenoid and outputting this command value to the line pressure solenoid.

The solenoid command setting section 24 carries out a lockup control by the steps of calculating a lockup clutch pressure command value to bring about a lockup state (lockup clutch release, slip lockup and lockup clutch fastening) set in advance in consideration of the fuel economy and the shift feeling, and outputting this command value to the lockup pressure solenoid.

The manager ECU 10 sets the target engine torque and the target shift stage by the powers train control processing as the operational guide of the engine 2 and the AT 4 for controlling the entire system, and command these respective operational guide to the engine ECU 6 and the AT ECU 8, the engine ECU 6 and the AT ECU 8 respectively control the operation of the engine 2 and the AT 4 by carrying out the engine control processing and the AT control processing according to the command.

In a case where the manager ECU 10 being a high level control element and the engine ECU 6 and the AT ECU 8 being low level control elements respectively independently carries out the control processing, in order for the control target value being the operational guide of the engine 2 and the AT 4 to be optimally set on the side of the manager ECU 10, the manager ECU 10 is required to adapt the control rule (specifically, map, operational expression, control constant, and the like utilized for setting respective target value) utilized for setting the control target value to operational characteristics of the engine 2 and the AT 4 controlled by the engine ECU 6 and the AT ECU 8.

Thus, in order to adapt the control rule on the side of the manager ECU 10 to the operational characteristics of the engine 2 and the AT 4, the engine ECU 6 and the AT ECU 8 transmit to the manager ECU 10 the characteristic information representing the operation characteristic of the engine 2 and the AT 4. On the side of the manager ECU 10, the control rule is set according to the characteristic information. Thus, respective control target values are set.

Further, a plurality of the control rules (specifically map and operational expression utilized for calculating all sorts of controlled variables when carrying out the control processing) are previously set corresponding to respective tuning patterns so that the engine ECU 6 and the AT ECU 8 can change the tuning patterns of the engine 2 and the AT 4 according to the specifications of a vehicle on which they are mounted. Further, the engine ECU 6 and the AT ECU 8 determine the control rule utilized when carrying out the control processing according to tuning selection information transmitted from the manager ECU 10. On the basis of the control rule, the controlled valuables for the engine control and the AT control are calculated.

Hereinafter, the setting processing of the control characteristics carried out by respective ECUs 6, 8 and 10 will be explained in order to determine the tuning patterns of the engine 2 and the AT 4 or in order for the manager ECU 10 side to carry out the control processing corresponding to control characteristics of the engine 2 and the AT 4.

Figure 3A:
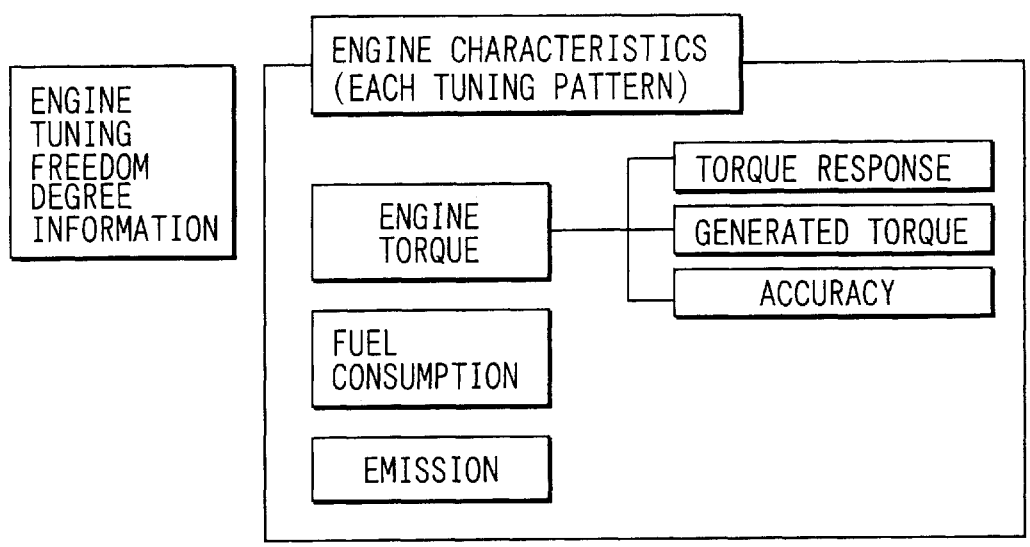
FIGS. 3A and 3B are explanatory diagrams illustrating tuning freedom degree information and characteristic information transmitted from an engine ECU and an AT ECU to a manager ECU.
Figure 3B:
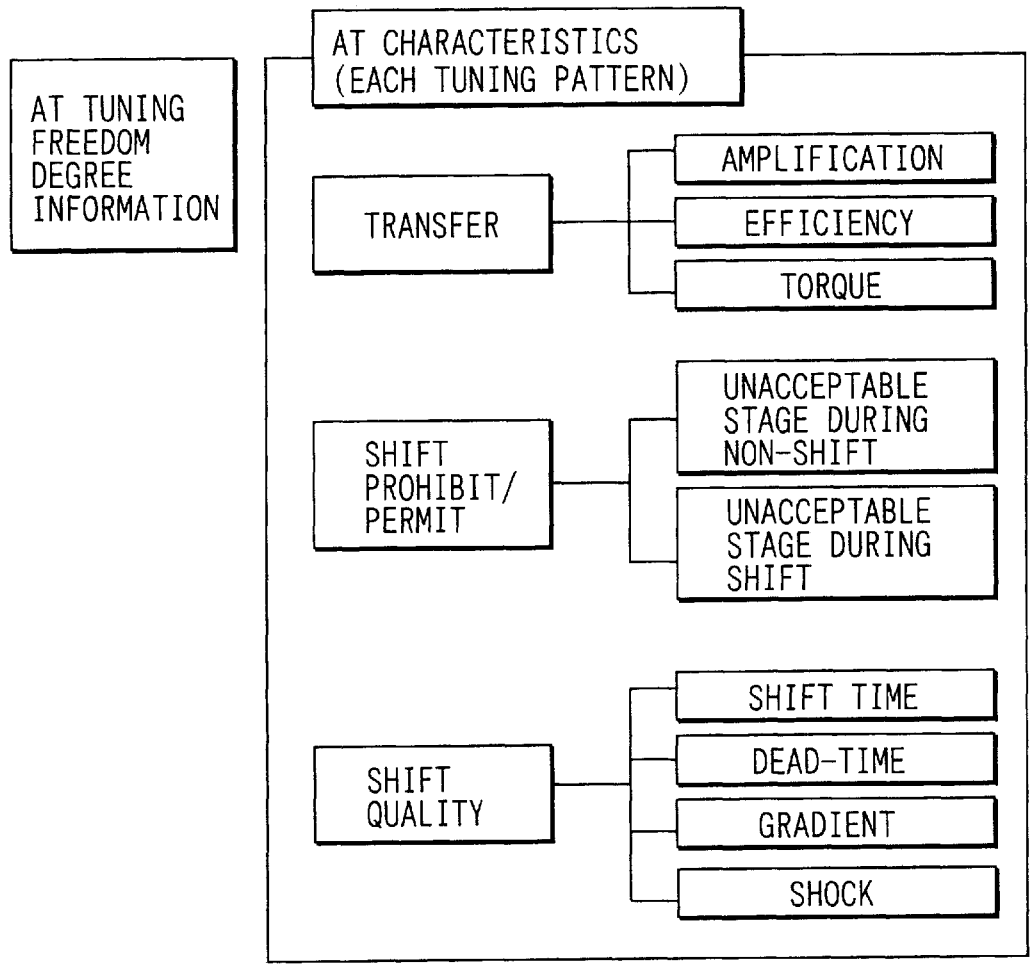

In order to carry out this processing, in the operational processing sections 6a and 8a in the engine ECU 6 and the AT ECU 8, as illustrated in FIGS. 3A and 3B, non-volatile memories (ROM) are provided. Stored in the memories in advance are the tuning freedom degree information representing a category of tuning patterns settable on the side of the respective ECU 6 and 8 and the characteristic information (engine and AT characteristic information) representing the operation characteristics of the engine 2 and the AT 4 controlled respectively by the control rules (tuning pattern) set according to the tuning selection information from the manager ECU 10. The engine ECU 6 and the AT ECU 8 read out the tuning freedom degree information or the characteristic information from these memories. The ECU 6 and ECU 8 transmit the information to the manager ECU 10.

Here, the tuning information (engine tuning freedom degree information) of the engine ECU 6 is the information indicating a degree of freedom that, for example, regarding an accelerating property, the engine tuning can be selected from among three patterns of the large acceleration, the medium acceleration and the small acceleration. In addition to the accelerating property of the engine 2, other patterns which takes into consideration a fuel consumption amount or the emission as a parameter can be given as well.

The engine ECU 6 informs the tuning pattern settable on the side of the engine ECU 6 with respect to the manager ECU 10 by transmitting the engine tuning freedom degree information to the manager ECU 10, the manager ECU 10 selects the tuning pattern capable to obtaining an engine characteristic suited to a vehicle class or the specifications (for example, specifications for luxury-class vehicle, specifications for sports vehicle, and specifications for family vehicle) of a vehicle on which a corresponding control system is mounted, on the basis of the engine tuning freedom degree information. The manager ECU 10 transmits the tuning selection information. representing the selection result to the engine ECU 6. Thus the engine ECU 6 sets the control rule utilized for a control to the control rule corresponding to the desired tuning pattern.

Further, the engine characteristic information as illustrated in FIG. 3A, includes an engine torque characteristic, a fuel consumption characteristic and an emission characteristic, and set for respective tuning patterns. All these information are the information utilized by the manager ECU 10 side for setting the target engine torque from the target axle torque.

Figure 4:
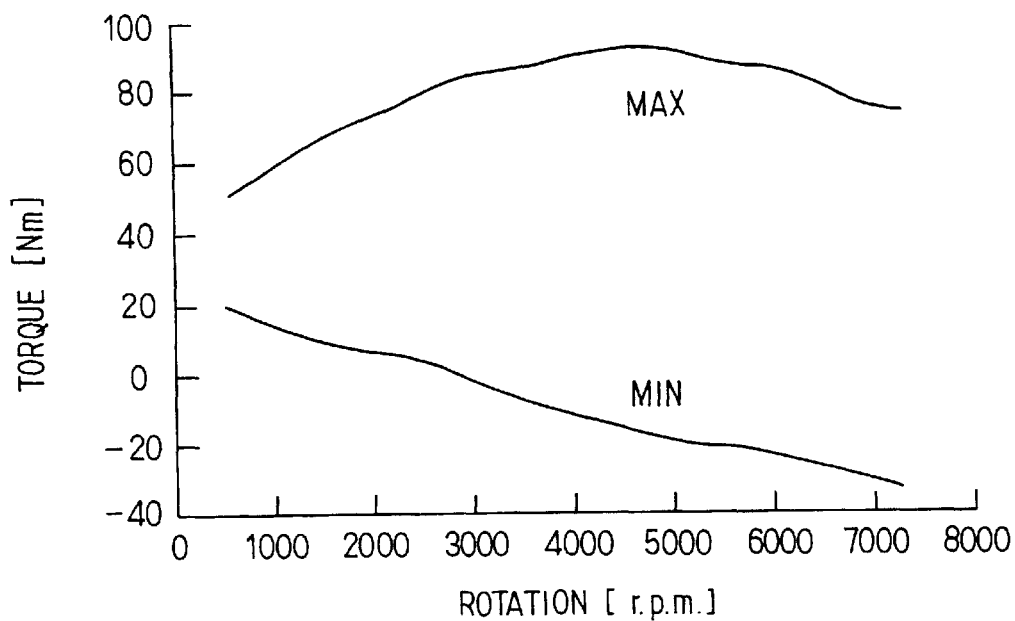
FIG. 4 is an explanatory graph illustrating a torque quantity characteristic generated in an engine.
Figure 5:
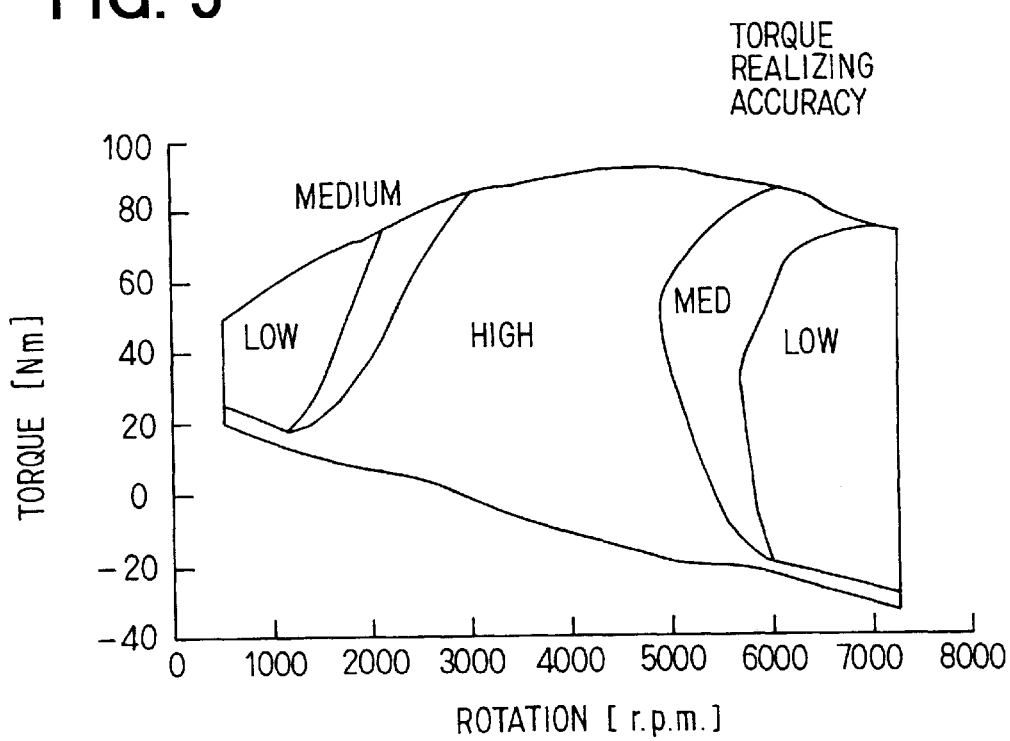
FIG. 5 is an explanatory graph illustrating a realizable accuracy characteristic of torque.

The engine torque characteristic is a characteristic equivalent to a generating drive power (torque) characteristic, in more detail, it includes an engine generating torque quantity equivalent to generation possible range of drive power illustrated in FIG. 4 representing the maximum torque and the minimum torque which the engine 2 can generate for every engine rotating speed, a torque response characteristic equivalent to The torque response characteristic, for example, can be expressed as a torque gradient at a time of rising and trailing of the engine torque, or can be expressed as dead-time, a time constant, or the like until torque is generated. Further, the torque realizing accuracy, for example, is set as a field divided in: "high", "medium" and "low" in the realizing accuracy as illustrated in FIG. 5 with respect to the engine rotating speed and the engine torque. The torque realizing accuracy, since it is changed by an engine water temperature or the like, is updated according to the change of these items.

Figure 6:
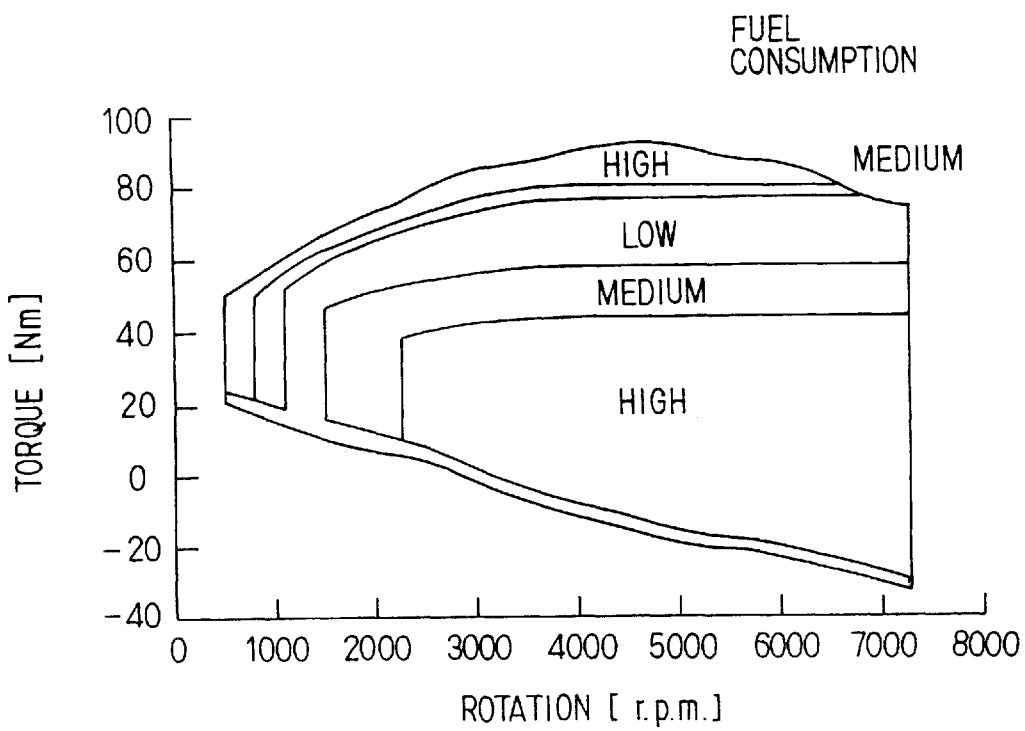
FIG. 6 is an explanatory graph illustrating a fuel consumption characteristic.
Figure 7:
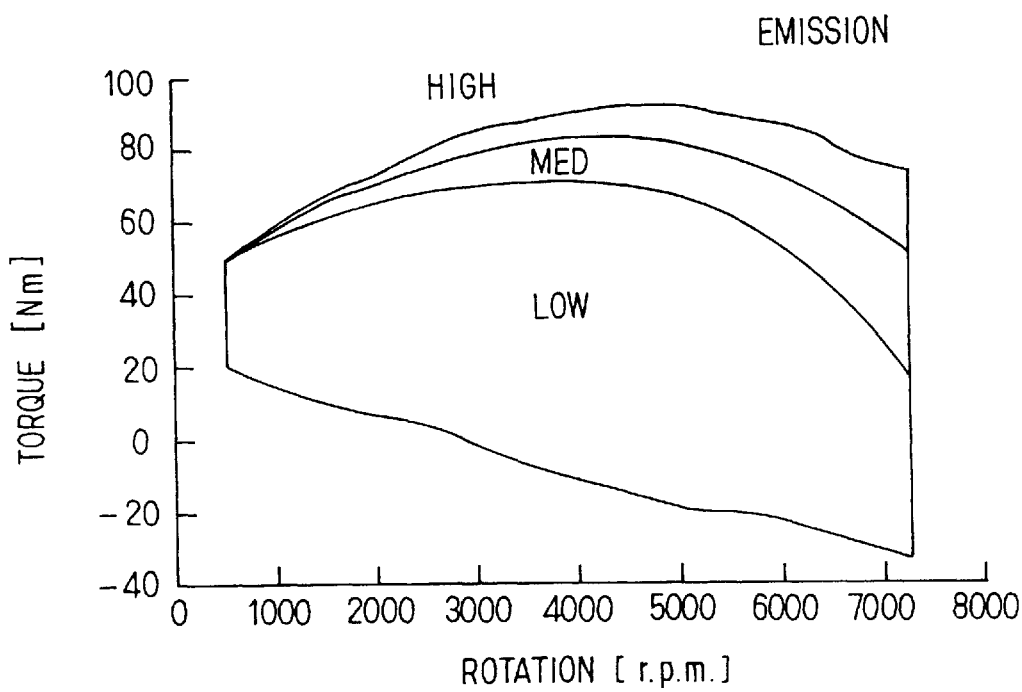
FIG. 7 is an explanatory graph illustrating an emission characteristic.

The fuel consumption characteristic includes the engine rotating speed and the map indicating the fuel consumption amount corresponding to the engine generation torque, for example, and is set as the field illustrated in FIG. 6 divided in: "high", "medium" and "low" in the fuel consumption characteristic. Further, the emission characteristic includes the engine rotating speed and the map indicating an emission index corresponding to the engine generation torque, for example, and is set as the field illustrated in FIG. 7 divided in: "high", "medium" and "low" in the emission. The emission index can be synthetically indicated as one sheet of map as illustrated in FIG. 7. However, a more accurate control is possible by indicating the indexes separated by NOx, HC and CO with a plurality of maps or functions.

On the other hand, tuning information (AT tuning freedom degree information) of the AT ECU 8 is the information indicating a degree of freedom, for example, that the AT tuning can be selected among the three patterns of quick, medium and gradual in regard of a shift feeling. Here, with regard to the shift feeling, for at Stance, a pattern to set transmission efficiency of the transmission or the like as the parameters can be selected as well.

Further, the AT ECU 8 informs the manager ECU 10 that the tuning pattern can be set on the side of the AT ECU 8 by transmitting the AT tuning freedom degree information to the manager ECU 10, the manager ECU 10 selects on the basis of the AT tuning freedom degree information the tuning pattern capable of obtaining a shift characteristic suited to the vehicle class or the specifications of a vehicle on which corresponding control systems are mounted, and transmits the tuning selection information representing the selection result to the AT ECU 8. Thereby, the AT ECU 8 side sets the control rule utilized for the control as the control rule corresponding to the desired tuning pattern.

The AT characteristic information, as illustrated in FIG. 3B, includes a transfer characteristic, a shift prohibition/permission characteristic and a shift quality characteristic, and set for respective tuning pattern. All this information is the information utilized on the manager ECU 10 side in order to set the target shift stage from the target axle torque.

Among the AT characteristic information, the transfer characteristic includes torque amplification factor information indicating a torque amplification ratio in front and in rear of the torque converter determined by an operation state of the torque converter and a lockup clutch, transmission efficiency information indicating the transmission efficiency of the transmission different for every shift stage, and transmittable torque information.

Figures 8, 9A, 9B:
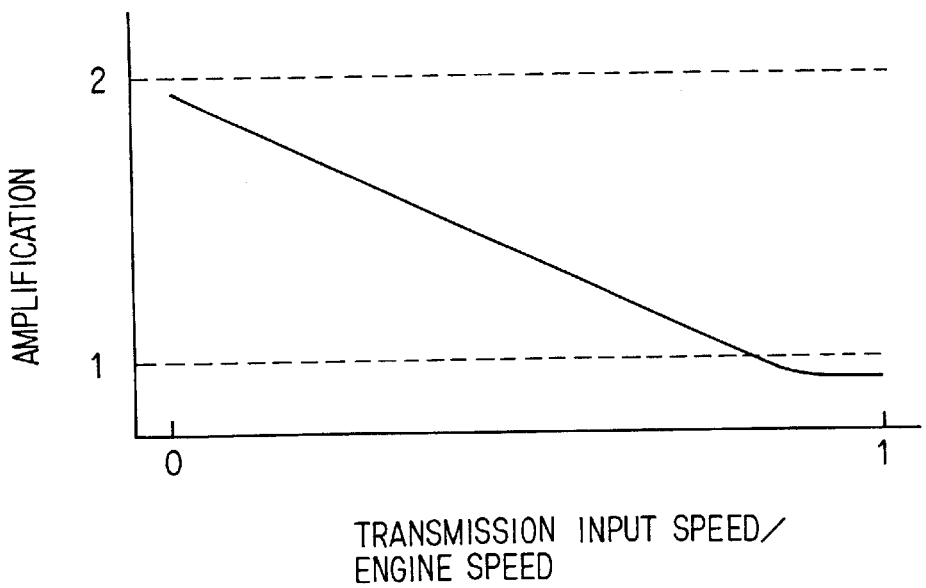
FIG. 8 is an explanatory graph illustrating torque amplification factor information.
FIGS. 9A and 9B are tables illustrating a shift permission/prohibition characteristic.

The torque amplification factor information, for example, is given as the map set for every operation condition of the torque converter and the lockup clutch as illustrated in FIG. 8. Since torque amplification factor is changed according to a temperature of the AT hydraulic fluid, these torque amplification factors are also changed according to the temperature of the AT hydraulic fluid. The transmission efficiency information is the information determined mainly in conjunction with dragged torque of a shift clutch, and is set for every shift stage. The transmittable torque is the information related to set hydraulic pressure in the transmission while shifting is hot carried out, and is given as the map corresponding to the target engine torque.

The shift permission/prohibition characteristic is the information indicating whether other shifts are acceptable or not when a shift is carried out or when a shift is not carried out, for example, as illustrated in FIG. 9A. This characteristic includes the information representing the shift stage not acceptable (unacceptable shift stage) when the shift is not carried out, for example, as illustrated in FIG. 9B, information representing a kind of the shift not able to accept the shift being carried out, and the information representing kinds of the shift not acceptable with respect to a progressing situation of the shift being carried out.

The shift quality characteristic includes required shift time information representing the time required from the start of the shift to the end of the shift, shift dead-time information representing time from acceptance of a shift command to actual start of the shift when the shift is commanded to the AT ECU 8 by a target shift stage command, rotating speed gradient information of a transmission input shaft, and shift shock information.

Here, the required shift time is the time until it can be determined that the shift is completely terminated, and can be set so as to include, in addition to the time to reach the transmission gear ratio to a set value of the target shift stage, the time required for a stroke when an accumulator is utilized for the control. Further, the shift dead-time is mainly the time required for fluid filling into a clutch chamber, and is capable of changing by the set hydraulic pressure during fluid filling.

The required shift time information and the shift dead-time information, for example, are set for kinds of the shift and for every execution condition of the shift as illustrated in FIG. 10 representing the shift dead-time at time of shifting from the fourth speed stage to the third speed stage. Further, the rotating speed gradient information of the transmission input shaft is the information relating to the magnitude of the inertia torque generated at shifting, for example as illustrated in FIG. 11A, and is set for the kind of the shift or for every conditions to carry out the shift.

On the other hand, the shift shock information is the information indicating a quality of a torque change operating on the axle at shifting, is represented as a degree of, for example, "large", "middle" and "small", and is set respectively with respect to two kinds of an up-shift and a down-shift of the transmission.

Figure 12:
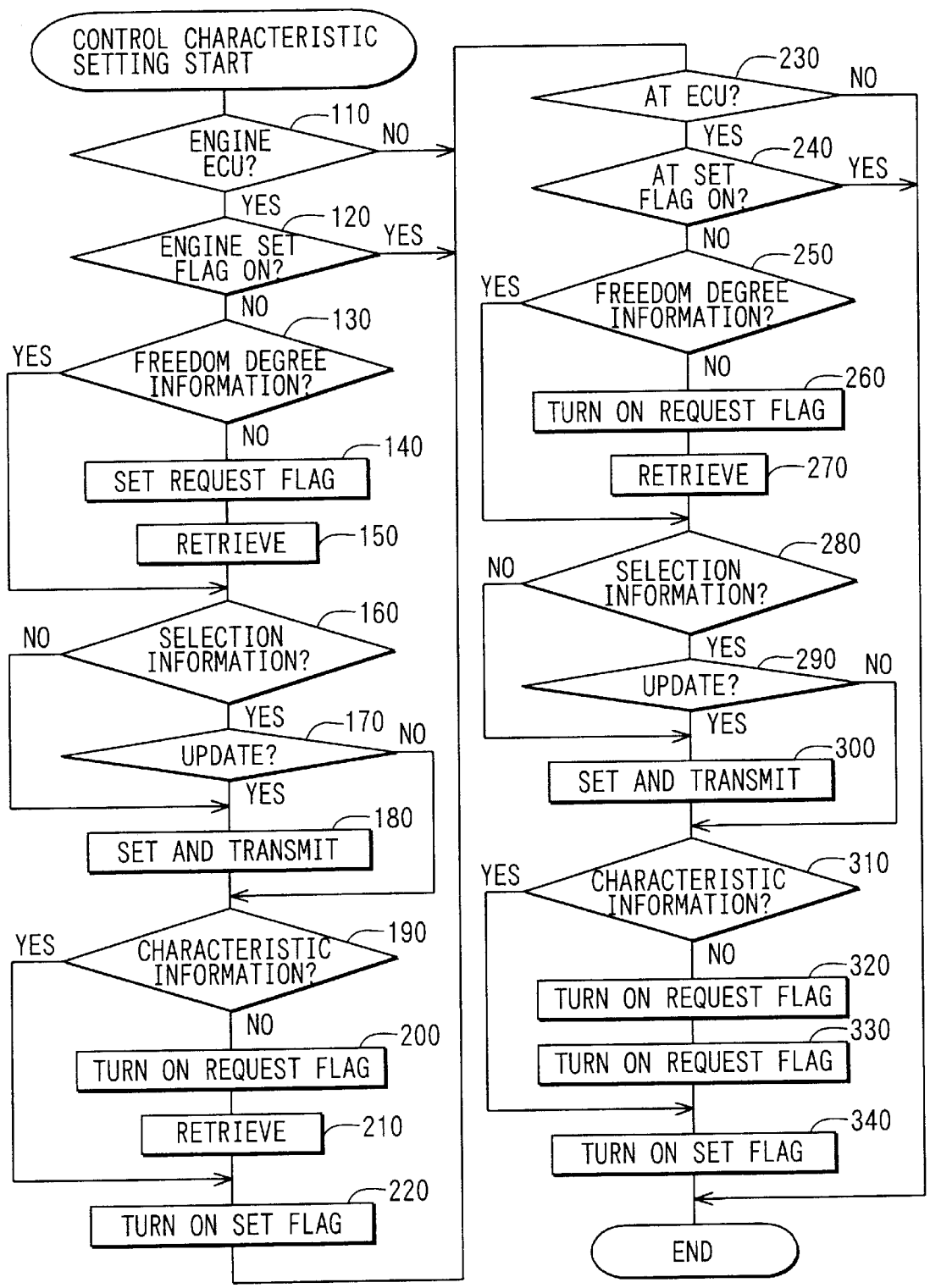
FIG. 12 is a flowchart illustrating setting processing of a power train control characteristic carried out by the manager ECU.

FIG. 12 is a flowchart illustrating the control characteristic setting processing (power train control characteristic setting processing) carried out in the manager ECU 10.

This processing is, for example, the processing carried out when the ignition switch of a vehicle is turned on, and an electrical power supply to the manager ECU 10 (entire ECUs constituting power train control system) is conducted.

As illustrated in FIG. 12, when the control characteristic setting processing of the power train is started, firstly, at step (S) 110, whether the engine ECU 6 is connected to the manager ECU. 10 via the communication line L or not is determined. Further, when the engine ECU 6 is connected to the ECU 10, the processing proceeds to S120. If not connected, the processing proceeds to S230.

At S120, whether a completion flag of the engine characteristic setting is set (ON) or not is determined. The completion flag of the engine characteristic setting is the flag which goes into a reset (OFF) state when the manager ECU 10 is in an initial state such as when the manger ECU 10 is assembled to a vehicle or in a case where the manager ECU 10 is reset by an exterior operation after assembling the ECU 10 to a vehicle. Then, this flag is switched to an ON state when the characteristic information of the engine 2 is retrieved from the engine ECU 6 by the processing described later. Further, when the completion flag of the engine characteristic setting is not turned on, the processing proceeds to S130, when the completion flag of the engine characteristic setting is turned on, the processing proceeds to S230.

At S130, it is determined whether or not the manager ECU 10 already retrieved the engine tuning freedom degree information from the engine ECU 6. If it is already obtained, the processing proceeds to S160. If not retrieved yet, the processing proceeds to S140.

Further, at S140, by turning on the request flag of the engine tuning freedom degree information, the engine tuning freedom degree information with respect to the engine ECU 6 is requested at S150. The engine tuning freedom degree information transmitted from the engine ECU 6 according to this request is obtained, and the processing proceeds to S160. The engine tuning freedom degree information retrieved at S150 is stored in a rewritable nonvolatile memory (for example, EEPROM) mounted in the operational processing section 6a. Further, at S150, when the engine tuning freedom degree information is retrieved, the request flag of the engine tuning freedom degree information is turned on.

Next, at S160, whether the engine tuning selection information is already set or not is determined. When the engine tuning selection information is already set, at the following S170 it is determined whether a updating of the engine tuning selection information is required by changing, for example, the specifications of a vehicle by a command from, for example an exterior section.

Further, at S170, when it is determined that there is no need to update the engine tuning selection information, the processing proceeds to S190. When, on the contrary, at S170, it is determined that the updating of the selection information is required, or, at S160, it is determined that the engine tuning selection information is not set, the processing proceeds to S180.

At S180, the most suitable tuning pattern in the engine tuning pattern realizable by the control processing of the engine ECU 6 is selected on the basis of the engine tuning freedom degree information retrieved from the engine ECU 6. The information representing the vehicle class and the specifications of a vehicle set in advance to the manager ECU 10, and the selected result is stored in the EEPROM or the like as engine tuning selection information. The selection information is transmitted to the engine ECU 6, and the processing proceeds to S190.

Next at S190, it is determined whether the engine characteristic information corresponding to the engine tuning selection information set at present is already obtained. Further, when the engine characteristic information is not yet retrieved, the processing proceeds to S200, the engine characteristic information is requested with respect to the engine ECU 6 by turning on the request flag of the engine characteristic information. At the following S210, the engine characteristic information transmitted from the engine ECU 6 according to this request is retrieved. The retrieved engine characteristic information is stored in the EEPROM or the like similarly to the engine tuning freedom degree information. Further, at S210, when the engine characteristic information is retrieved the request flag of the engine characteristic information is turned on.

In this way, when determined that the engine characteristic information is retrieved at S210, or at S190 the engine characteristic information is already retrieved, the processing proceeds to S220. Further, at S220, setting of the tuning pattern of the engine 2 and retrieving of the engine characteristic information setting completion are stored by turning on the completion flag of the engine characteristic setting, and the processing proceeds to S230.

Next, at S230, whether the AT ECU 8 is connected to the manager ECU 10 via the communication line L or not is determined. Further, if the AT ECU 8 is connected to the manager ECU 10, the processing proceeds to S240. If not connected, this processing is terminated.

At S240, whether the completion flag of the AT characteristic setting is turned on or not is determined. The completion flag of the AT characteristic setting is a flag, similarly to the completion flag of the engine characteristic setting, which becomes OFF state when the manager ECU 10 is in an initial state such as when the manager ECU 10 is assembled to a vehicle or when the manager ECU 10 is reset by an operation of an exterior section after assembling to a vehicle. This completion flag is switched to the ON state when the characteristic information of the AT 4 is retrieved from the AT ECU 8 by the processing. Further, when the completion flag of the AT characteristic setting is not turned on, the following processing is terminated. On the contrary, when the completion flag of the AT characteristic setting is turned on, the processing proceeds to S250.

At S250, whether the AT tuning freedom degree information from the AT ECU 8 is retrieved or not is determined. if it is already retrieved, the processing proceeds to S280. If not yet retrieved, the processing proceeds to S260.

Further, at S260, the AT tuning freedom degree information is requested with respect to the AT ECU 8 by turning on a request flag of the AT tuning freedom degree information. At the following S270, the AT tuning freedom degree information transmitted from the AT ECU 8 following this request is retrieved, and the processing proceeds to S280. The AT tuning freedom degree information retrieved at S270 is stored in the EEPROM or the like. Further, at S270, when the AT tuning freedom degree information is retrieved, the request flag of the AT tuning freedom degree information is turned on.

Next, at S280, whether the AT tuning selection information is already set or not is determined. When the AT tuning selection information is already set, whether the updating the AT tuning selection information is required or not is determined at step S290, based on a change or the like of the specifications of a vehicle by commands from exterior section.

Further, at S290, when it is determined that there is no need to update the AT tuning selection information, the processing proceeds to S310. On the contrary, when it is determined at S290 that the updating of the selection information is required, or when it is determined at S280 that the AT tuning selection information is not set, the processing proceeds to S300.

At S300, the most suitable tuning pattern in the AT tuning pattern realizable by the control processing of the AT ECU 8 is selected on the basis of the AT tuning freedom degree information retrieved from the AT ECU 8, the information representing the vehicle class or the specifications of a vehicle set in advance by the manager ECU 10. The selection result is stored as the AT tuning selection information to EEPROM or the like. Also the selection information is transmitted to the AT ECU 8, and the processing proceeds to S310.

Next at S310, whether the AT characteristic information corresponding to the AT tuning selection information set at present is already retrieved or not is determined. Further, when the AT characteristic information is not yet retrieved, the processing proceeds to S320. The AT characteristic information is requested with respect to the AT ECU 8 by turning on the request flag of the AT characteristic information. In the following S330, the AT characteristic information transmitted from the AT ECU 8 is retrieved in response to the request. The retrieved AT characteristic information is stored in the EEPROM or the like similarly to the AT tuning freedom degree information. Further, when the AT characteristic information is retrieved, the request flag of the AT characteristic information is turned on at S330.

In this manner, when it is determined at S310 that the AT characteristic information is already retrieved or when the AT characteristic information is retrieved at S330, the processing proceeds to S340. Further, at S340, the completion of setting of the tuning pattern of the AT 4 and the acquisition of the AT characteristic information are stored by turning on the completion flag of the AT characteristic setting. Thus, the control characteristic setting processing is terminated.

In this way, in the manager ECU 10, the optimum of tuning pattern to the specifications of a vehicle is selected and set among the tuning patterns of the engine 2 and the AT 4 realizable on the side of the engine ECU 6 and the AT ECU 8. The characteristic information when the engine 2 and the AT 4 are controlled by the tuning pattern is obtained.

Further, the manager ECU 10 sets the optimum command value (target engine torque and target shift stage) for controlling the entire power train by setting the control rule (map, operational expression, control constant, or the like) utilized for setting the target engine torque or the target shift stage according to the obtained characteristic information of the engine 2 and the AT 4.

Figure 13:
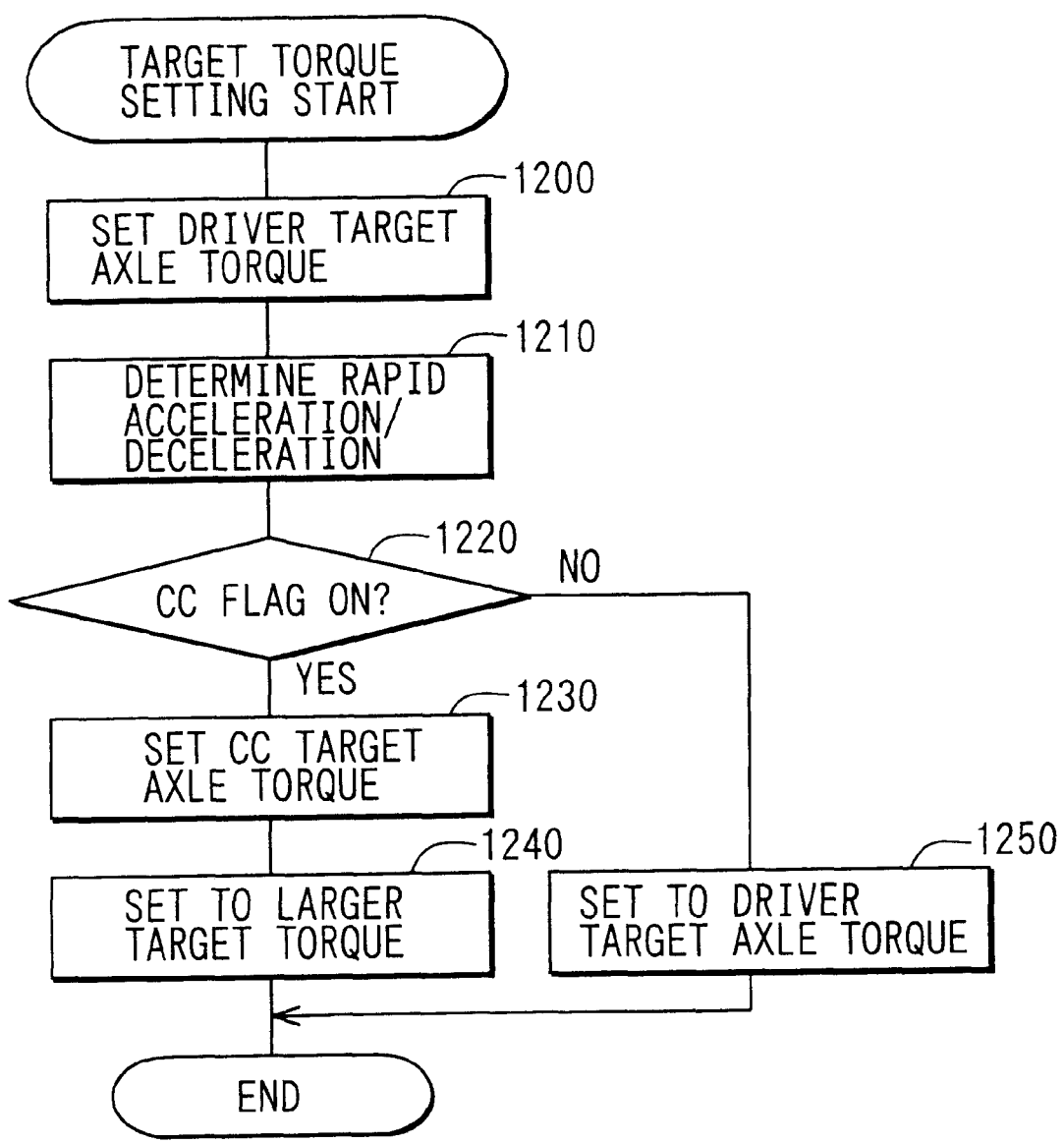
FIG. 13 is a flowchart illustrating setting processing of target axle torque carried out by the manager ECU.
Figure 14:
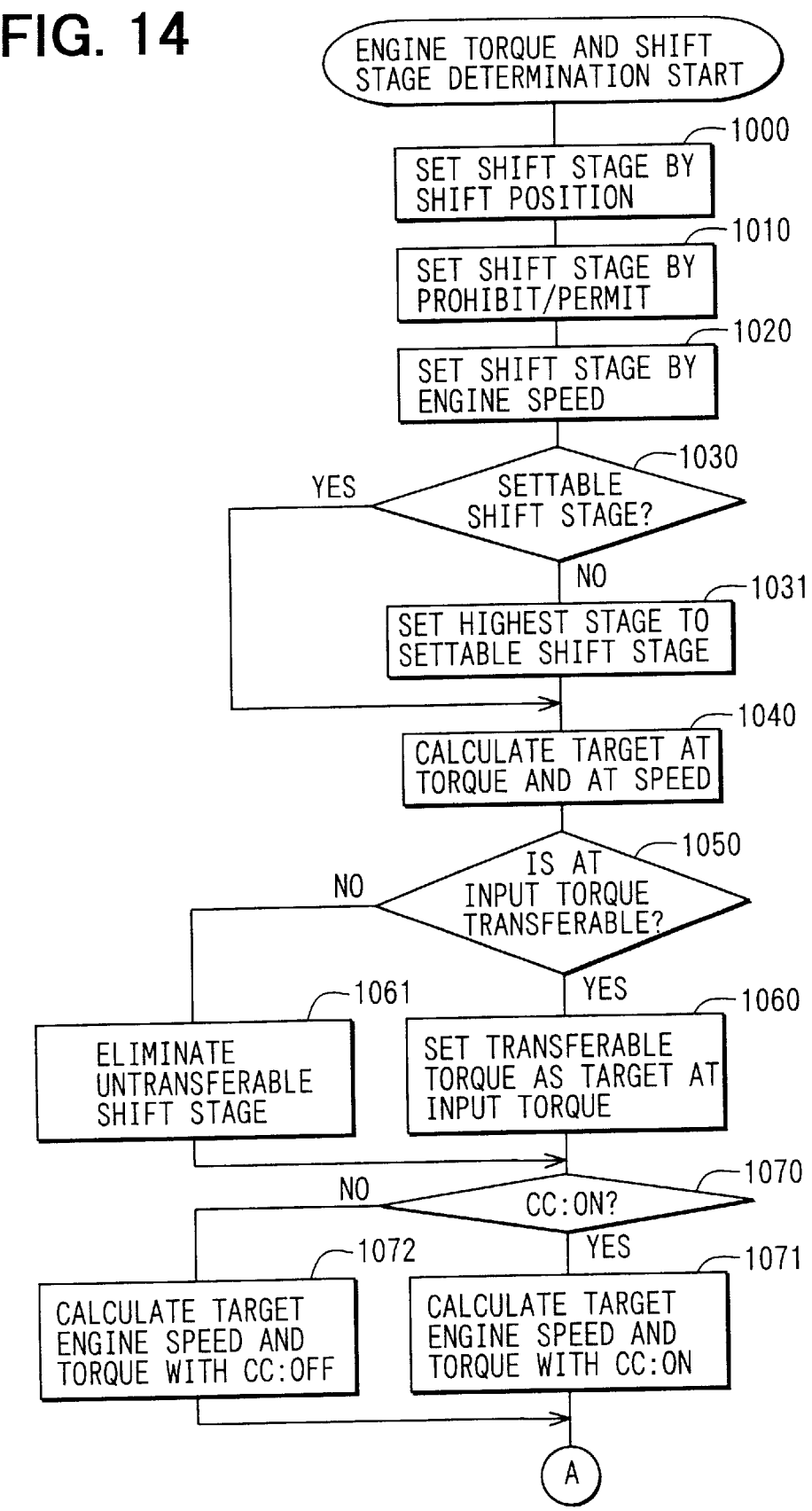
FIG. 14 is a flowchart illustrating a first half portion of determining processing of an engine torque shift stage carried out by the manager ECU.
Figure 15:
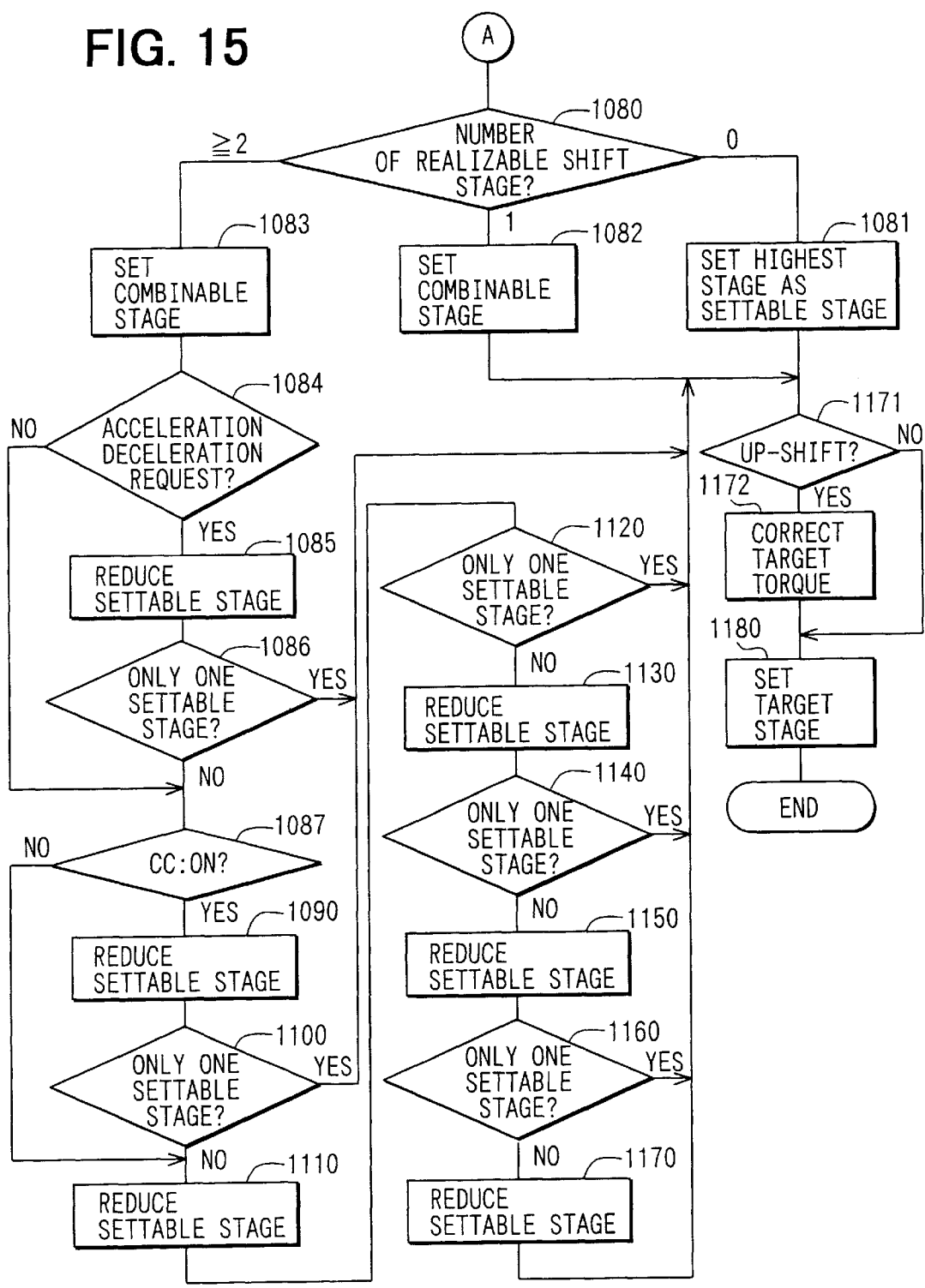
FIG. 15 is a flowchart illustrating a latter half portion of determining processing of an engine torque shift stage carried out by the manager ECU.

Next, flowcharts illustrated in FIG. 13 to FIG. 15 are explained as for the steps in which the manager ECU 10 computes the target engine torque and the target shift stage on the basis of the respective characteristic information, that is, as for the setting processing of the target axle torque and the shift stage determining processing of the engine torque carried out by the manager ECU 10 for realizing the functions as the setting section 12 of the target axle torque and setting section 14.

As illustrated in FIG. 13, in the target axle torque setting processing, at S1200, the target axle torque (driver target axle torque) is set corresponding to an accelerator operation of a driver on the basis of the position of the accelerator pedal and the vehicle speed. At S1210, a rapid acceleration/deceleration request from a driver is determined on the basis of the pedal operation speed by a driver. It is determined at S1220 whether the CC flag transmitted from the CC ECU is turned on or not (whether present cruise control (CC) is carried out or not) is determined.

At S1220, when the CC flag is determined to be turned on, the processing proceeds to S1230, the target axle torque (CC target axle torque) required for realizing the CC target acceleration/deceleration speed transmitted from the CC ECU is set. At step S1240, the CC target axle torque or the driver target axle torque obtained at S1200, whichever is larger, is set as the target axle torque utilized for the control. After that, this processing is terminated for a moment.

Further, at S1220, when it is determined that the CC flag is turned on, the processing proceeds to S1250. The driver target axle torque obtained at S1200 is set as it is as the target axle torque utilized for the control.

Next, FIG. 14 and FIG. 15 illustrate the engine torque and shift stage determining processing.

As illustrated in FIG. 14, at S1000, the shift stage settable from the present shift position is set. That is, for example, when the AT 4 is the four speed AT, the shift stages settable with respect to the shift positions are predetermined as in a case where the shift position determined by the lever operation of a driver is in a D range, a first, a second, a third, and a fourth speed can be settable. In the case of two ranges, merely a first and a second speed can be settable. Therefore, at S1000, these are set as settable shift stages.

Next, at S1010, among the shift stages indicated as settable at S1000, the settable shift stage from the shift prohibition/permission characteristic is set. That is, since the shift prohibition/permission characteristic illustrated in FIG. 9A and 9B causes the settable shift stages to be restricted according to the present shift stage or a shift progressing situation, the settable shift stages are set at S1010 by utilizing the shift prohibition/permission characteristic of FIG. 9A and FIG. 9B.

At S1010, when the settable shift stages are determined by utilizing the map illustrated in FIG. 9B, it is necessary to grasp the shift progressing situation such as whether the shift in execution is in the dead-time or not, or whether it is in the middle of the changeover of the transmission gear ratio or not. For example, the present shift progressing situation is grasped by utilizing the information of the shift dead-time or the required shift time illustrated in FIG. 10. The settable shift stage is set according to the result.

At S1020, the shift stages settable from the viewpoint of the engine rotating speed is set among the shift stages determined as settable at S1010. That is, when the shift stages of the low side which is high in the transmission gear ratio is selected in a state of high vehicle speed, the engine is liable to be in over speed. On the contrary, when the shift stage of the high side in which the transmission gear ratio is low in a state of low vehicle speed is selected. Since there is a danger of leading to knocking or an engine stall without maintaining the revolution, the shift stages possible to be set is set at S1020.

At step S1030, whether the settable shift stages exist or not is determined from the setting results at S1020. When there is no settable shift stages at S1031 among the settable shift stage (shift stages set at S1000) from an observing point of shift position, the shift stages of the most high side is selected. After selecting this as a settable shift stage, the processing proceeds to S1040. That is, in this case (fail state), the shift stage is set so that the vehicle speed is lowered by decreasing the axle torque. When it is determined at S1030 that there is a settable shift stage, the processing moves to S1040.

At S1040, the target AT input torque and the target AT input rotating speed of the settable shift stages are calculated. These respective parameters are calculated with respect to all the shift stages set in a case where a plurality of shift stages are set as settable shift stages by the above processing. Among these parameters, the target AT input torque is calculated by dividing the target axle torque by a gear ratio at the shift stage and by the transmission efficiency. Further, the target AT input rotating speed is calculated by multiplying the AT output rotating speed calculated from the present vehicle speed, a tire effective diameter, and a differential gear ratio by the gear ratio at shift stage.

Next, at step S1050, by comparing the target AT input torque with the transmittable torque, whether the target AT input torque can be transmitted or not is determined. Further, in a case where the target AT input torque cannot be transmitted for all the settable shift stages, the shift stage which is the highest ratio in which torque is transmittable with respect to the target AT input torque is set as a settable shift stage at step S1060. The transmittable torque is set as the target AT input torque. On the other hand, when there is a settable shift stage in which the target AT input torque can be transmitted, the shift stages (torque-untransferable stage) which cannot transmit the target input torque is omitted from the settable shift stages at S1061 in order to set merely the settable shift stages as the settable shift stages in which the target AT input torque can be transmitted.

Next, at S1070, whether the CC is turned on or not (whether cruise control is currently being carried out or not) is determined on the basis of the CC flag transmitted from the CC ECU. Further, when the CC is turned on, the target engine rotating speed and the target engine torque are calculated at S1071 for every shift stage set as the settable shift stage.

The target engine rotating speed is calculated by "target AT input rotating speed×the latest engine rotating speed ÷ the latest AT input rotating speed". The target engine torque is calculated by "target AT input torque÷torque amplification factor". However, for the torque amplification factor and the torque response characteristic, the characteristics which are retrieved from the engine ECU 6 and the AT ECU 8 are utilized.

On the other hand, when the CC is turned on (when cruise control is under stoppage), the target engine rotating speed and the target engine torque are calculated at S1072 for respective shift stages set as the settable shift stages.

The target engine rotating speed is calculated similarly to when the CC is turned on by "target AT input rotating speed×the latest engine rotating speed÷the latest AT input rotating speed". The target engine torque is utilized the target AT input torque as it is.

The reason, why the torque amplification factor is taken into consideration in a case where the CC is turned on and the torque amplification factor is not taken into consideration in a case where the CC is turned on, is that the torque amplification factor obtained from the torque amplification factor characteristics shows good coincidence with the actual torque amplification factor under a static condition where the change of the torque is small. However, under a transitional condition where the change of the torque is large, a deviation becomes large.

That is, in the present embodiment, the torque amplification factor is taken into consideration at a time when the change of the torque is comparatively small and the axle torque should be controlled with good accuracy, that is, the CC is turned on. However, when the CC is turned on which is liable to set large the change of the torque, that is, in a case where a vehicle is traveled on the basis of the accelerator operation of a driver, the torque amplification factor is constituted so as not to be taken into consideration.

At S1071 and S1072, when the target engine rotating speed and the target engine torque are set for respective shift stages set as settable shift stages, the processing moves to S1080 illustrated in FIG. 15. Further, at S1080, the number of the settable shift stages in which the target engine rotating speed and the target engine torque can be combined is determined on the basis of a torque quantity characteristic generated in an engine as illustrated in FIG. 4. That is, at S1080, if the target engine torque in the target engine rotating speed calculated at S1070 resides between the maximum torque and the minimum torque for every settable shift stage, it is determined that that shift stage is realizable. If the target engine torque is larger than the maximum torque or smaller than the minimum torque, that shift stage is determined as impossible to be realized.

Further, as a result of this determination, when there is no shift stage realizable (in the case where number of realizable shift stages is equal to 0), the highest geared shift stage among the settable shift stages at the time the S1070 being carried out is set as the settable shift stages at S1081, and the processing proceeds to S1171. Further, when the number of shift stage realizable is just one as a result of determination at S1080, that shift stage is set as the settable shift stage (combinable stage) at S1082, and the processing proceeds to the S1171.

On the other hand, when there is a plurality (more than one) of the realizable shift stages as a result of determination at S1080, such shift stages are set as settable shift stages at S1083, and the processing proceeds to S1084.

At S1084, on the basis of the result of the determination processing of the S1210 carried out at the setting processing of the target axle torque described above, whether the rapid acceleration/deceleration is requested or not at present with respect to a vehicle is determined. Further, if there is no request for the rapid acceleration/deceleration, the processing proceeds to S1087. If there is a request for the rapid acceleration/deceleration, the processing proceeds to S1085, and the settable shift stages are reduced by comparing response time of the transmission with one another.

Specifically, with respect to the target engine torque corresponding to the settable shift stages, response time of the engine torque is determined. When the response characteristics of the engine torque are set in three stages of good, medium, and bad, the response time is set as a specific time such as, for example, the good corresponds to 200 msec, the medium corresponds to 400 msec, the bad corresponds to 600 msec. These numerals are set in advance. Further, the shift dead-time and the required shift time are calculated with respect to the settable target shift stages, the total time obtained by summing up three kinds of time is set as the entire shift time. By comparing these values, the shortest combination of the entire shift time is selected.

Further, whether the number for the selected settable shift stages is one or not is determined at S1086. If the number of the settable shift stages is one, the processing proceeds to S1171.

On the other hand, when determined at S1086 that there is a plurality of settable shift stages, the processing proceeds to S1087. At S1087, on the basis of the CC flag, whether the CC is turned on or not is determined. Further, when the CC is turned on, the processing proceeds to S1110. When the CC is turned on, the settable shift stage is reduced at S1090 on the basis of the torque realizing accuracy.

The reason for reducing the shift stages on the basis of the torque realizable accuracy when the CC is turned on is that, in a case where the CC is turned on, since a driver becomes sensitive to the movement of a vehicle such as slight shaking of the vehicle compared with the case where the driver drives a vehicle by own operation, the priority is given to a condition small in a fluctuation of the torque. Further, in the present embodiment, in a case where the vehicle is made to travel according to the operation of a driver (that is, when CC is turned on), since the driver gives more importance to a fuel economy or the like than a movement of a vehicle such as shaking of a vehicle, the reduction of the settable shift stages according to the torque realizing accuracy is normally contrived not to be conducted.

Next, at S1090, on the basis of a realizable accuracy characteristic of the torque (FIG. 5), the settable shift stages are reduced. For example, in the case of the realizable accuracy characteristic of the torque illustrated in FIG. 5, the shift stage having the best realizable accuracy at present among the shift stages set as the settable shift stages is reduced as the settable shift stage. In a case where the settable shift stage cannot be reduced to one (for example, when a plurality of settable shift stage are entered in field of "good accuracy"), a plurality of shift stages having good realizable accuracy are set as the settable shift stages.

Further, at step S1100, as a result of processing of the S1090, whether the settable shift stages are reduced to one or not is determined. Further, when the number of the settable shift stages is one, the processing proceeds to S1171. When there is a plurality of the settable shift stages, then the processing proceeds to S1110.

At S1110, on the basis of the fuel consumption characteristics (FIG. 6), the settable shift stages are reduced. For example, in the case of the fuel consumption characteristic illustrated in FIG. 6, the shift stage having the best fuel consumption characteristic among the settable shift stages is reduced as settable shift stage. In a case where from this viewpoint, the settable shift stages are not reduced to one, a plurality of shift stages having low fuel consumption characteristics are set as the settable shift stages. Further, at step S1120, as a result of the processing at S1110, whether the settable shift stages are reduced to one or not is determined, when the settable shift stage is one, the processing proceeds to S1171. When there are a plurality of the set table shift stages, the processing proceeds to S1130.

At S1130, on the basis of the emission characteristic (FIG. 7), the settable shift stages are reduced. For example, in the case of the emission characteristics illustrated in FIG. 7, the shift stage having the lowest emission characteristic among the settable shift stages is reduced as the settable shift stage. In a case where the settable shift stages are not reduced to one, a plurality of shift stages having low emission characteristics are set as the settable shift stages. Further, when the number of the settable shift stage is one as a result of the processing of the S1130, whether the number of he settable shift stages are reduced to one or not is determined at step S1140, and the processing proceeds to S1171. When there are a plurality of settable shift stages, the processing proceeds to S1150.

At S1150, on the basis of a difference between a plurality of the settable shift stages set at present and the target shift stage of the previous time, the settable shift stages are reduced by extracting the settable shift stage having the smallest value of the difference. This is because, in terms of feeling or in terms of the durability of machine, it is preferable no to shift. In a case where the number of the shift stages are not reduced to one, that is, the shift stage having the same target shift stage as that of the previous time among the settable shift stages does not exist, further, in a case where the shift stages in changing at the same number of stages on an up side and on a down side of the target shift stages of the previous time exists as the settable shift stages such as one stage up or one stage down of the target shift stage of the previous time is settable, the two stages are set as the settable shift stages.

At S1160, as a result of the processing at S1150, whether the number of the settable shift stages is reduced to one or not is determined. When the number of the settable shift stages is one, the processing proceeds to S1171. When there is a plurality of settable shift stages, the processing proceeds to S1170.

Next, at S1170, on the basis of the shift shock information or the like, the settable shift stages are reduced. That is, for example, in a case where the shift shock is different between an up-shift and a down-shift, the shift shock of the up-shift is smaller than that of the down-shift, the settable shift stage is set as the up-shift side shift stage. On the contrary, in a case where the shift shock of the down-shift is smaller than that of the up-shift, the down-shift side shift stage is set as the settable shift stage, with such steps, the settable shift stages are reduced.

In a case where the shift shock of the up-shift is the same as that of the down-shift or both of the shifts are substantially same, the settable shift stage is set according to the rule previously set. That is, since the shift stage is not determined by every sorts of characteristics determined up to now, the shift stages are determined following the pre-set rule. For instance, in a case where a vehicle is with the specifications of a sport vehicle, the shift stage is determined on a down side. In the case of a vehicle of the specifications of a high class vehicle, the shift stage is determined on an up side. Further, after completing the processing in this S1170, the processing proceeds to the following S1171.

At S1171, whether the up-shift is performed or not is determined by comparing the shift stage of the present stage with the target shift stage. Here, in a case where the target shift stage is in a higher speed stage than the shift stage of the present stage, it is determined as the up-shift. Further in a case where the up-shift is not performed, the processing proceeds to S1180. On the contrary, in a case where the up-shift is performed, the processing proceeds to S1172.

At S1172, a correction of the target engine torque is carried out. This is for the purpose of decreasing the target engine torque on the basis of the rotating speed gradient information of the transmission input shaft aiming at a reduction in a shift shock in an up-shift and at a decrease in the heat load of the shift clutch.

Specifically, a rotating speed gradient of the target transmission input shaft is found by utilizing a rotating speed gradient map of the target transmission input shaft illustrated in FIG. 11B set on the basis of a rotating speed gradient characteristic of the transmission input shaft illustrated in FIG. 11A stored in the AT ECU 8. The the target engine torque down-quantity is calculated by utilizing as resources the target engine torque at that time and the map previously set according to the rotating speed gradient of the target transmission input shaft. Further, the result subtracted the target engine torque down-quantity from the target engine torque is set as the target engine torque.

This processing is the processing carried out by aiming at a reduction in the engine torque of equivalent amount of the inertia torque. That is, to the axle torque, the inertia torque is overlapped according to the rotating speed gradient of the transmission input shaft. Since this causes the worsening of the shift shock and the increase in the heat load of the shift clutch, the processing of the S1171 and the S1172 are carried out in order to prevent these problems from occurring.

Further, in the end, at S1180, the settable shift stage (here, stage becomes just one) set by a series of processing is set as the target shift stage of the AT 4. This is outputted to the AT ECU 8. Also the target engine torque corresponding to the target shift stage is outputted to the engine ECU 8. Thus, this shift stage determining processing of the corresponding engine torque is terminated for a moment.

As described above, at setting section 14 of the manager ECU 10, the optimum target engine torque and the target shift stage in terms of controlling the entire power train are set on the basis of the every sorts of characteristics information retrieved from the engine ECU 6 and the AT ECU 8 by carrying out the setting processing of the power train control characteristic illustrated in FIG. 12. Accordingly, the manager ECU 10 can invariably and optimally control the engine 4 and the AT 8 via the engine ECU 6 and the AT ECU 8.

Figure 16:
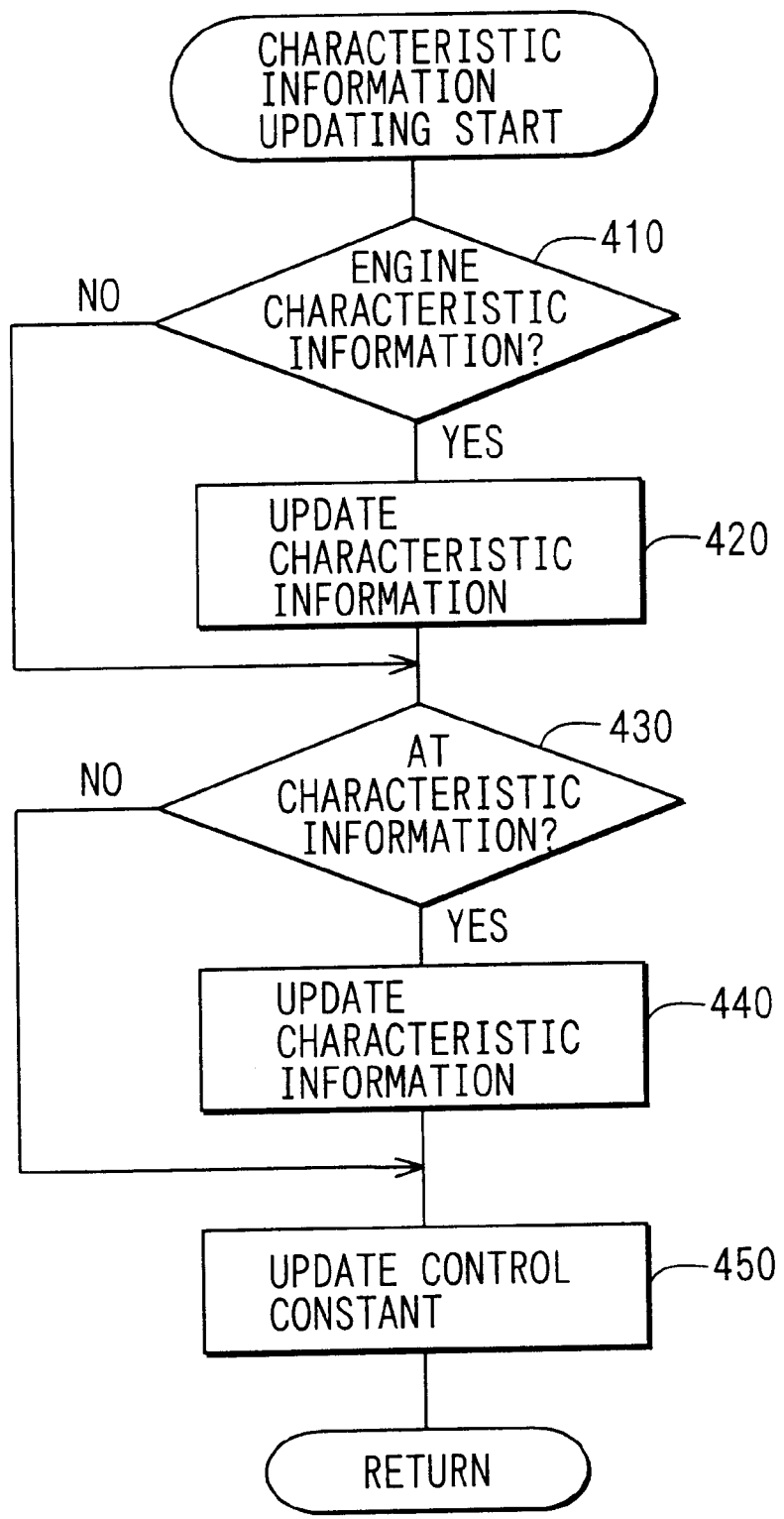
FIG. 16 is a flowchart illustrating updating processing of characteristic information carried out by the manager ECU.

Next, FIG. 16 is a flowchart illustrating the updating processing of the characteristic information carried out periodically every predetermined time by the manager ECU 10.

This processing is the processing carried out for retrieving the characteristic information transmitted when the characteristic information is changed from the engine ECU 6 and the AT ECU 8, and updating the characteristic information stored in the EEPROM or the like.

That is, since the torque realizable accuracy is changed according to the engine cooling water temperature or the like among the engine characteristic information transmitted from the engine ECU 6, the engine ECU 6 carries out the setting processing of the engine control characteristic described later, when the torque realizable accuracy is changed. The engine ECU 6 is contrived to transmit the torque realizable accuracy after the change to the manager ECU 10 the torque amplification factor and the transmission efficiency. The torque amplification factor and the transmission efficiency are changed by the temperature of the AT hydraulic fluid among the AT characteristic information transmitted from the AT ECU 8. The AT ECU 8 carries out the setting processing of the AT control characteristic described later. The AT ECU 8 is contrived to transmit the torque amplification factor and the transmission efficiency after the change to the manager ECU 10. Thus, the manager ECU 10 side accepts the characteristic information transmitted unexpectedly from the engine ECU 6 and the AT ECU 8, and periodically carries out the updating processing of the characteristic information to be capable of updating the characteristic information retrieved previously.

As illustrated in FIG. 16, in the updating processing of the characteristic information, whether the engine characteristic information (torque realizable accuracy described above) from the engine ECU 6 is received or not is determined at S410. In a case where the engine characteristic information is received, the engine characteristic information stored in the EEPROM or the like is updated at S420 on the basis of the engine characteristic information received.

Further, it is determined at S410 whether the engine characteristic information is received. If received, the engine characteristic information is updated at S420. Whether the AT characteristic information from the AT ECU 8 (torque amplification factor and transmission efficiency) is received or not is determined at S430. In a case where the AT characteristic information is received, the AT characteristic information stored in the EEPROM or the like is updated at S440 on the basis of the received AT characteristic information.

Further, finally, when the characteristic information is updated at S420 or S440, the S450 carries out the updating processing of the control constant updating the control constant utilized for setting the target engine torque or the target shift stage or the like, on the basis of the characteristic information.

After the updating, this processing is terminated. When the characteristic information of the engine 2 and the AT 4 is not updated, the processing is terminated without updating the control constant.

Figure 17:
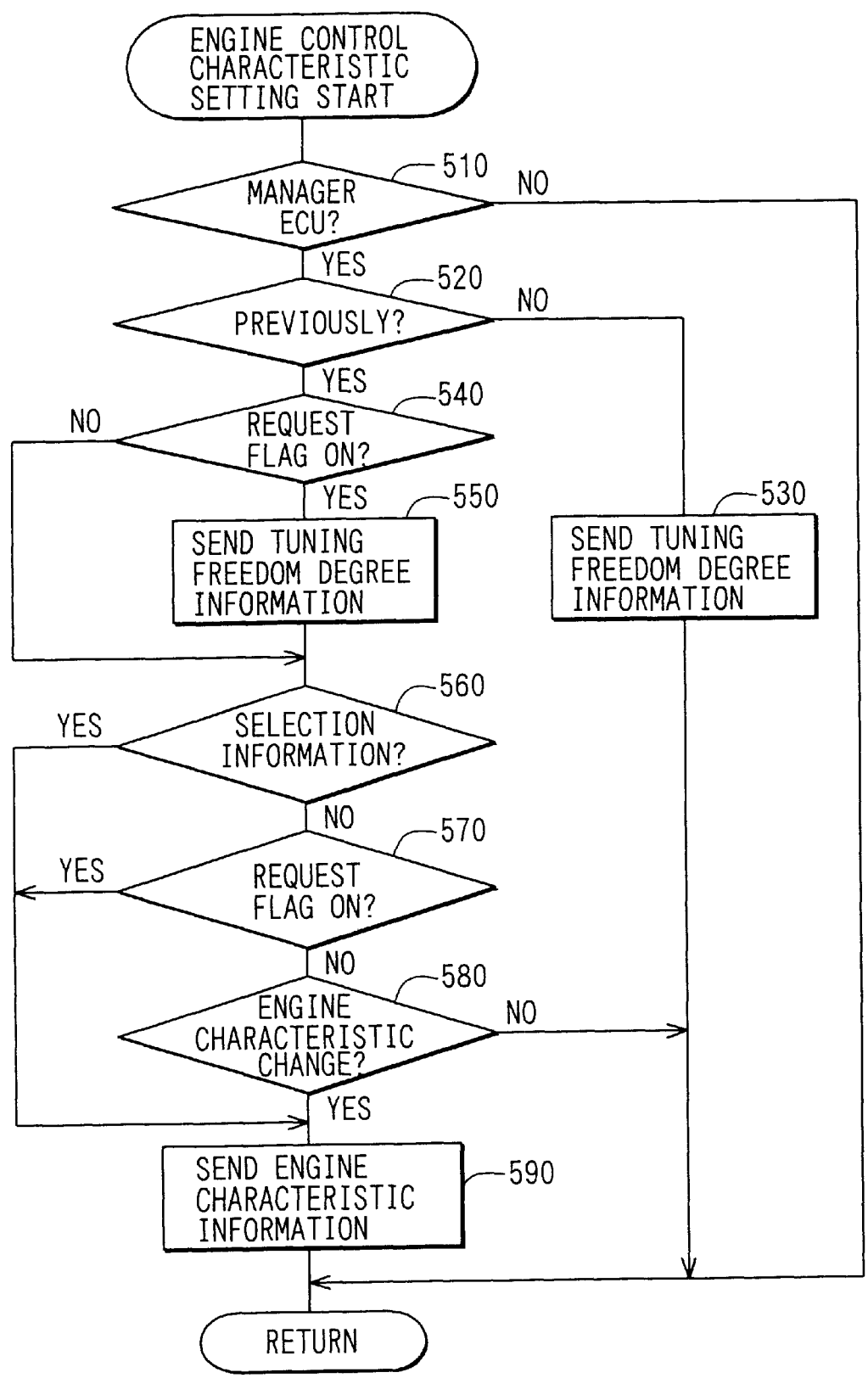
FIG. 17 is a flowchart illustrating setting processing of an engine control characteristic carried out by the engine ECU.

Next, FIG. 17 is a flowchart illustrating a setting processing of the engine control characteristic carried out by the engine ECU 6. This processing is the processing carried out periodically every prescribed time in the engine ECU 6.

It is determined first at S510 whether the manager ECU 10 is connected to the engine ECU 6 via the communication line L or not. Further, when the manager ECU 10 is not connected to the engine ECU 6, this processing is terminated as it is. When the manager ECU 10 is connected to the ECU 6, the processing proceeds to S520 to determine whether the manager ECU 10 is connected to the ECU 6 or not previously when this processing is carried out in the previous time.

In the case where it is determined at S520 that the manager ECU 10 is not connected to the ECU 6 in the previous time, this processing is terminated after transmitting the engine tuning freedom degree information at S530. On the contrary, if it is determined that the manager ECU 10 is connected to the ECU 6 even in the previous time, the processing proceeds to S540 to determine whether the request flag of the engine tuning freedom degree information is determined. This request flag is turned on or off on the side of the manager ECU 10.

In a case where the request flag of the engine tuning freedom degree information is in the ON state and the manager ECU 10 the engine tuning freedom degree information, the engine tuning freedom degree information is sent to the manager ECU 10 at S550. Then, the processing proceeds to S560. On the contrary, when the request flag of the engine tuning freedom degree information is in an OFF state, the processing proceeds to S560.

Next, whether the engine tuning selection information transmitted from the manager ECU 10 is received or not is determined at S560. When the engine tuning selection information is not received yet, the processing proceeds to S570 to determine whether the request flag of the engine characteristic turned on/off on the side of the manager ECU 10 is in the ON state or not. When the request flag of the engine characteristic information is not in the ON state, the processing proceeds to S580 to determine whether the engine characteristic is changed or not.

The determination processing at S580 is the processing for determining whether the engine characteristic information to be grasped on the side of the manager ECU 10 is changed or not. In the present embodiment, since the torque realizable accuracy is changed by the engine cooling water temperature or the like among the engine characteristic information transmitted to the manager ECU 10, the determination processing is carried out at S580 by determining whether the engine cooling water temperature is changed or not from the water temperature range up to now to the water temperature field in which the torque realizable accuracy is to be updated.

Further, when it is determined at S580 that the engine characteristic is not changed, this processing is terminated as it is. On the contrary, the processing proceeds to S590, if it is determined that the engine characteristic is changed at S580, it is determined at S560 that the engine tuning selection information is received, or it is determined at S570 that the request flag of the engine characteristic information is in the ON state.

The processing carried out at S590 is the processing for sending the present engine characteristic information to the manager ECU 10. When the engine tuning selection information is received, the tuning pattern of the engine 2 is set to the tuning pattern requested by the manager ECU 10 following the engine tuning selection information by setting the control rules utilized for the engine control to the control rule corresponding to the selection information. The engine characteristic information corresponding to that tuning pattern is read out from the memory, and the engine characteristic information is transmitted to the manager ECU 10. Further, in a case where the request flag of the engine characteristic information in the ON state and the manager ECU 10 requests the engine characteristic information, the engine characteristic information corresponding to the present set tuning pattern is read out from the memory. This information is transmitted to the manager ECU 10.

In this transmission, the engine characteristic information (in present embodiment, with respect to, torque realizable accuracy changed according to engine cooling water temperature or the like) among the engine characteristic information, the engine characteristic information read out from the memory is corrected according to the engine state. The engine characteristic information after the correction is sent. Further, upon carrying out S590 when it is determined at S580 that the engine characteristic is changed, only the changed engine characteristic (in present embodiment, torque realizable accuracy) is transmitted as an updating data of the engine characteristic information.

Thus, after the engine characteristic information is transmitted to the manager ECU 10 at S590, this processing is terminated. This processing is restarted after the prescribed time is elapsed after that.

Figure 18:
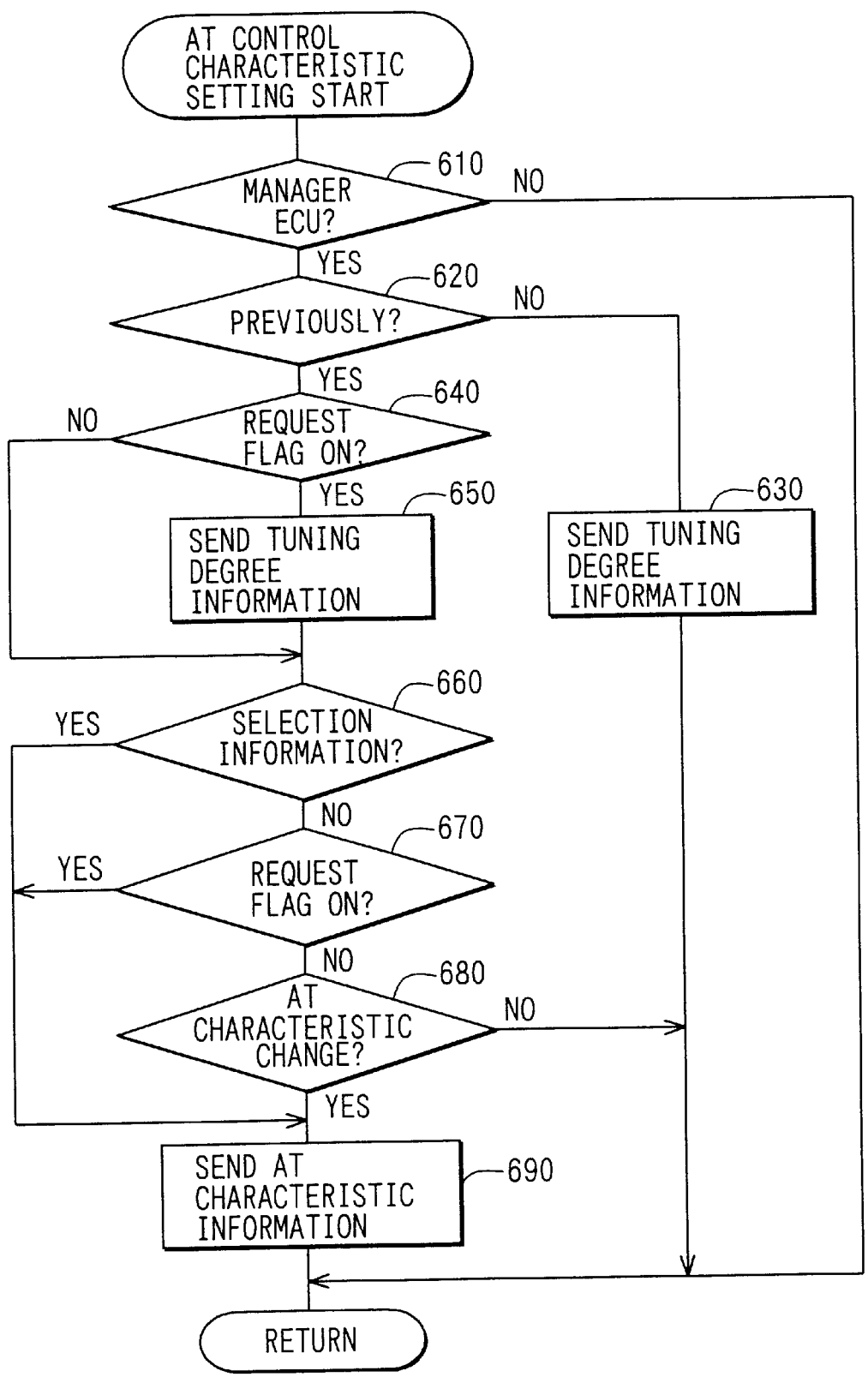
FIG. 18 is a flowchart: illustrating setting processing of an AT control characteristic carried out by the AT ECU.

Next, FIG. 18 is a flowchart illustrating the setting processing of the AT control characteristic carried out by the AT ECU 8. This processing is the processing for carrying out periodically every prescribed time in the AT ECU 8.

When the processing is started, it is determined at S610 whether the manager ECU 10 is connected to the AT ECU 8 via the communication line L or not. If the manager ECU 10 is not connected to the AT ECU 8, this processing is terminated as it is. When the manager ECU 10 is connected to the AT ECU 8, the processing proceeds to S620. Whether the manager ECU 10 is connected to the AT ECU 8 or not is determined at S620 when this processing is carried out in the previous time.

In a case where the manager ECU 10 is not connected to the AT ECU 8 at the previous time is determined at S620, the AT tuning freedom degree information is sent at S630 and this processing is terminated. On the contrary, if the manager ECU 10 is connected to the AT ECU 8 also in the previous time, the processing proceeds to S640. It is determined whether the request flag of the AT tuning freedom degree information turned on and off on the side of the manager ECU 10 is in the ON state or not.

Further, in a case where the request flag of the AT tuning freedom degree information is in the ON state and the manager ECU 10 requests the AT tuning freedom degree information, the AT tuning freedom degree information is sent to the manager ECU 10 at S650, and this processing proceeds to S660. On the contrary, if the request flag of the AT tuning freedom degree information is in the OFF state, the processing proceeds to the S660 as it is.

Next, it is determined at S660 whether the AT tuning selection information transmitted from the manager ECU 10 is received or not. If the AT tuning selection information is not received, the processing proceeds to S670 to determine whether the request flag of the AT characteristic information turned on and OFF on the side of the manager ECU 10 is in the ON state or not. When the request flag of the AT characteristic information is not in the ON state, the processing proceeds to S680 and determines whether the AT characteristic is changed or not.

The determination processing at S680 is the processing for determining whether the AT characteristic information to be grasped on the side of the manager ECU 10 is changed or not. In the present embodiment, among the AT characteristic information to transmit to the manager ECU 10, the torque amplification factor and the transmission efficiency are changed according to the temperature of the AT hydraulic fluid, and the shift dead-time and the required shift time are changed according to a change with the elapse of time (time change) of the hydraulic mechanism or the clutch of the AT. It is determined at S680 whether temperature of the AT hydraulic fluid is changed or not from the temperature range up to now to the temperature range in which the torque amplification factor and the transmission efficiency are to be updated. It is also determined whether the characteristics of the shift dead-time and the required shift time according to the determination of a change with the elapse of time described later are to be updated or not.

Further, when it is determined at S680 that the AT characteristic is not changed, this processing is terminated as it is. On the contrary, the processing proceeds to S690, when it is determined at S680 that the AT characteristic is changed, it is determined at S660 that the AT tuning selection information is received, or it is determined at S670 that the request flag of the AT characteristic information is in the ON state. The determination processing at S690 is the processing for transmitting the present AT characteristic information to the manager ECU 10. When the AT tuning selection information is received, following the AT tuning selection information, the tuning pattern of the AT 4 is set to the tuning pattern requested by the manager ECU 10 by setting the control rule utilized by the shift control to the control rule corresponding to the selection information. The AT characteristic information corresponding to the tuning pattern is read out from the memory, and the AT characteristic information is sent to the manager ECU 10. Further, in a case where the request flag of the AT characteristic information is in the ON state and the manager ECU 10 requests the AT characteristic information, the AT characteristic information corresponding to the present set tuning pattern is read out from the memory. This AT characteristic information is sent to the manager ECU 10.

In the transmitting operation, among the AT characteristic information, the AT characteristic information (in present embodiment, torque amplification factor and transmission efficiency changing according to temperature AT of hydraulic fluid) changing according to the AT state, the AT characteristic information read out from the memory is corrected according to the AT state. The corrected AT characteristic information is transmitted to the manager ECU 10. Further, in carrying out S690 when it is determined at S680 that the AT characteristic is changed, only the changed AT characteristic (in the present embodiment, torque amplification factor and transmission efficiency) is sent to the manager ECU 10 as an updating data of the AT characteristic information.

In this way, when the AT characteristic information is transmitted to the manager ECU 10 at S690, this processing is terminated. After the prescribed time is elapsed, this processing is restarted.

Next, the determination processing of the change with the elapse of time carried out by the AT ECU 4 will be explained.

As described above, the characteristics of the shift dead-time and the required shift time are transmitted from the AT ECU 4 to the manager ECU 10. The characteristics are changed according to the change of oil in the AT hydraulic pressure control mechanism, or the deterioration of the clutch. Thus, in the present embodiment, the change with the elapse of time of the transmission is determined by the determination processing of the change with the elapse of time, the characteristics of the shift dead-time and the required shift time suited to an actual situation are set.

The method to determine the change with the elapse of time with the determination processing of this change of the elapse of time will be explained with reference to FIG. 19, which illustrates the behavior of the AT input rotating speed and the axle torque accompanied with the up-shift of a shift stage.

Figure 19:
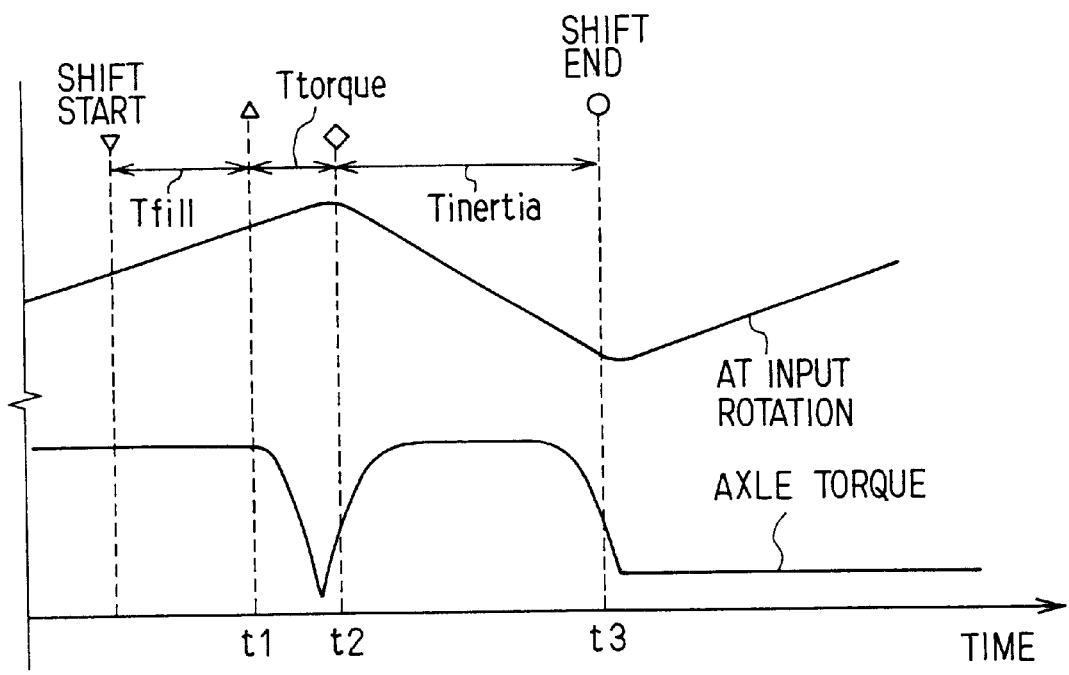
FIG. 19 is a timing diagram illustrating a behavior of an AT input rotating speed and an axle torque accompanied with an up-shift of an shift stage.

A period "Tfill" up to the time t1 from the shift control start illustrated in FIG. 19 is the period utilized for filling of oil or the like. The AT input rotating speed shows no change accompanied with the shift while maintaining the rotating speed specified by the shift stage of before the shifting. The axle torque shows no change accompanied with the shift. Further, the period is equivalent to the shift dead-time.

Next, the change accompanied with the shift appears in the axle torque. At time t2 after an elapse of the period "Ttorque" from time t1, the change accompanied with the shift appears in the AT input rotating speed. This period "Ttorque" is generally referred to as a torque phase. Further, after that, at time t3 when the AT input rotating speed reaches the rotating speed specified by the shift stage after the shift, and the shift is terminated. The period "Tinertia" from time t2 up to the termination of the shift (time t3) is generally referred to as an inertia phase. Further, the period "Ttorque" of this torque phase added to the period "Tinertia" of the inertia phase results in the period "Ttorque +Tinertia". This period is equivalent to the required shift time.

The AT ECU 8 is provided with the rotating speed sensor for detecting the rotating speed of the AT input shaft. However, a sensor for detecting the axle torque is not provided. Thus, although the terminating timing (time t1) of the shift dead-time after the start of the shift cannot be detected, the end timing (time t2) of the torque phase after the start of the shift, and the end timing (time t3) of the inertia phase can be detected from the change of the AT input rotating speed obtained by the rotating speed sensor.

Thus, in the determination processing of the change with the elapse of time, these respective timing (time t2 and t3) are detected on the basis of the AT input rotating speed, By estimating the period "Ttorque" of the torque phase, the shift dead-time and the required shift time are detected. Further, by comparing the shift dead-time and the required shift time detected as described above and comparing the shift dead-time and the required shift time utilized in the control at present, the change with the elapse of time of the transmission is determined. When the change with the elapse of time is determined, these respective parameters (shift dead-time and required shift time) are updated.

Next, the determination processing of the time change (change with the elapse of time) will be explained along the flowcharts illustrated in FIG. 20 and FIG. 21. This processing is the processing carried out every prescribed time as timer interrupt executed by the AT ECU 8.

Figure 20:
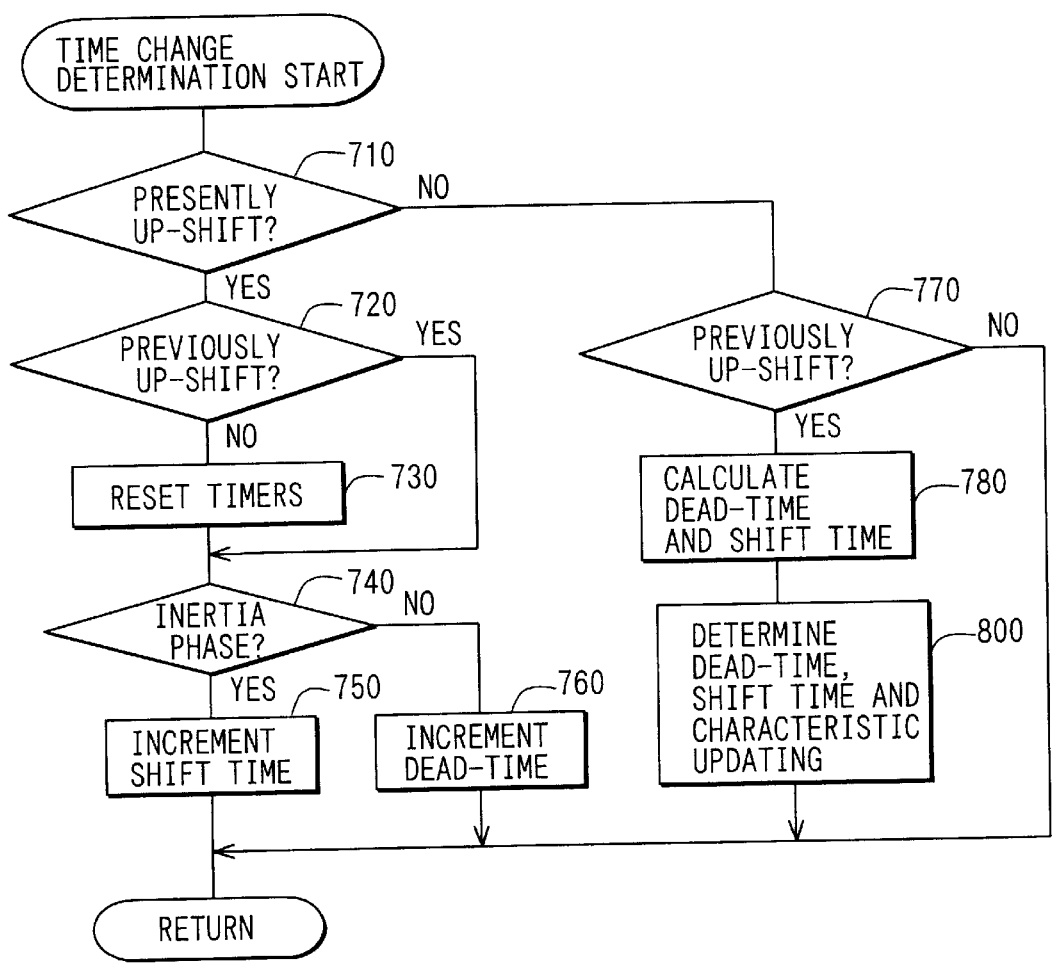
FIG. 20 is a flowchart illustrating determining processing of a change of the elapse of time carried out by the AT ECU.

As illustrated in FIG. 20, when the processing is started, it is determined at S710 whether it is currently in an up-shift or not. Further, when it is in the up-shift, it is determined at S720 whether it has been in the up-shift when the processing is carried out at the previous time or not. If it has not been in the up-shift at the previous time, the processing proceeds to S730 and determines that it is currently at just after the start of the shift. The timers (specifically, counters for clocking) for measuring the shift dead-time and the required shift time are reset.

Next, when the respective timers described above are reset at S730 it is determined at S720 that it has been in the up-shift at the previous time, the processing proceeds to S740 to determine from the change of the AT input rotating speed whether it is currently being in the inertia phase or not. When determined at step S740 that it is at present in the inertia phase, a measured timer of the required shift time is incremented at S750. On the contrary, when determined that it is not in the inertia phase, the measured timer of the shift dead-time is incremented. This processing is terminated for a moment.

On the other hand, when determined at S710 that it is not in the up-shift, it is determined at S770 whether it has been in the up-shift or not when this processing was carried out at the previous time. Further, when it has not been in the up-shift at the previous time, this processing is terminated as it is for a moment. However, on the contrary, if it has been in the up-shift at the previous time, the processing proceeds to S780 to calculate the shift dead-time and the required shift time.

That is, at S780, the period "Ttorque" of the torque phase is estimated by utilizing the present operation state (for example the AT input rotating speed or present shift stage or the like) of the transmission. The shift dead-time and the required time are calculated by utilizing the estimated value and the respective value of the timer described above.

Further, when the shift dead-time and the required shift time are calculated at S780, the processing proceeds to S800 so that the change with the elapse of time of the transmission is determined on the basis of these respective parameters and the respective parameters are updated. After the characteristic updating determination processing is carried out, and this processing is terminated for a moment.

Figure 21:
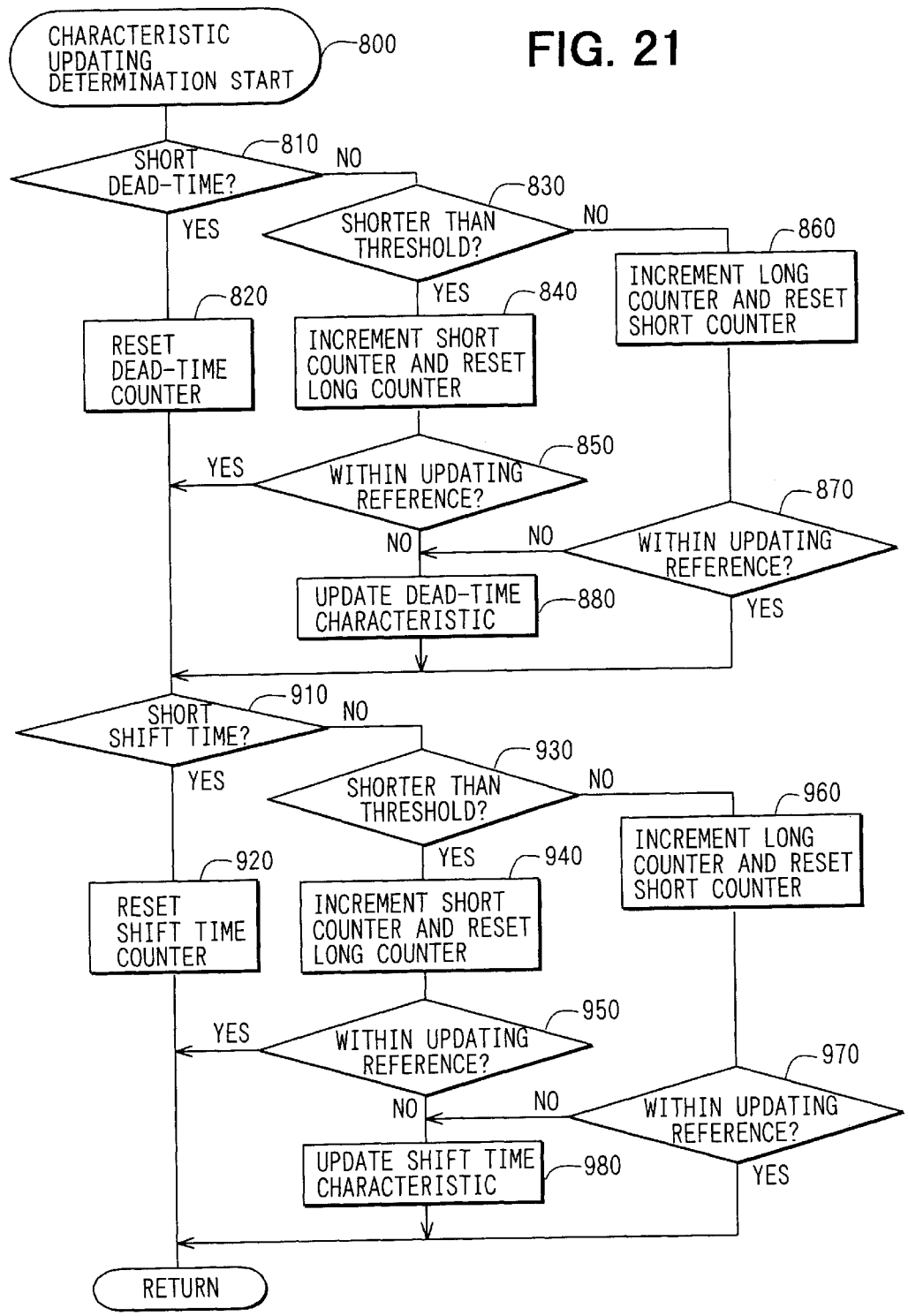
FIG. 21 is a flowchart illustrating updating determining processing of a shift characteristic carried out in FIG. 20.

FIG. 21 is a flowchart illustrating the characteristic updating determination processing carried out at S800.

As illustrated in FIG. 21, in this processing, it is first determined at S810 whether the shift dead-time detected this time is short enough to be within the prescribed range (reference or threshold level) set from the shift dead-time set at present as the center. When the shift dead-time is within the reference level, since the shift dead-time is not necessitated to be updated, the shift dead-time long/short determining counters (long counter and short counter) are reset. The processing proceeds to S910.

On the other hand, when it is determined at S810 that the shift dead-time is not within the reference level, the processing proceeds this time to S830 to determine whether the shift dead-time is the time having a short value by more than the reference level with respect to the shift dead-time set at present. When the shift dead-time is short, the processing proceeds to S840 to increment the short shift dead-time determination counter and reset the long shift dead-time determination counter. The processing proceeds to S850.

It is determined at S850 whether the value of the short shift dead-time determination counter incremented at S840 is within the reference level (updating reference level) for the shift dead-time updating determination or not. If the value of the short shift dead-time determination counter is within the updating reference level, the processing proceeds to S910. On the contrary, if the value of the short shift dead-time determination counter exceeds the updating reference level, the processing proceeds to S880. The shift dead-time characteristic utilized for the control is updated to the shift dead-time characteristic which is set so that the shift dead-time becomes shorter than the present characteristic. The processing proceeds to S910.

If it is determined at S830 that the shift dead-time is determined to be longer than the reference level with respect to the shift dead-time set at present, the processing proceeds to S860 to increment the long shift dead-time determination counter and reset the short shift dead-time determination counter. The processing proceeds to S870.

It is determined at S870 whether the value of the long shift dead-time determination counter incremented at S860 is within the reference level (updating reference level) for the updating determination of the shift dead-time or not. If the value of the long shift dead-time determination counter is within the updating reference level, the processing proceeds to S910. On the contrary, when the value of the long shift dead-time determination counter exceeds the updating reference level, the processing proceeds to S880. The shift dead-time characteristic utilized for the control is updated to the shift dead-time characteristic whose shift dead-time is set to become longer than the present characteristic. The processing proceeds to S910.

It is determined at S910 whether the required shift time detected this time is within the prescribed range (reference level) set from the required shift time at present as the center. When the required shift time is within the reference level, since the required shift time is not necessitated to be updated, the required shift time determination counters are reset. Thus this processing is terminated.

On the other hand, if it is determined at S910 that the required shift time is not within the reference level, the processing proceeds to S930 this time to determine whether the required shift time is shorter by more than the reference level with respect to the required shift time set at present. When the required shift time is short, the processing proceeds to S940 to increment the short required shift time determination counter, also resetting the long required shift time determination counter, and the processing proceeds to S950.

At S950, whether the value of the short required shift time determination counter added at. S940 is existed within the reference level (updating reference level) for updating determination of the required shift time or not is determined. Further, the value of the short required shift time determination counter is within the updating reference level, this processing is terminated as it is. On the contrary, when the value of the short required shift time determination counter exceeds the updating reference level, the processing proceeds to S980. The required shift time characteristic whose required shift time is set shorter than the present characteristic, and this processing is terminated.

When it is determined at S930 that the required shift time is longer than the reference level with respect to the required shift time set at present, the processing proceeds to S960. The long required shift time determination counter is incremented and the short required shift time determination counter is reset, proceeding to S970.

It is determined at S970 whether the value of the long required shift time determination counter incremented at S960 is within the reference level (updating reference level) for updating determination of the required shift time. If the value of the long required shift time determination counter is within the updating reference level, this processing is terminated as it is. On the contrary, if the value of the long required shift time determination counter exceeds the updating reference level, the processing proceeds to S980. The required shift time characteristic utilized for the control is updated to the required shift time characteristic whose required shift time is set longer than the present characteristic. Thus this processing is terminated.

In the above embodiment, the engine ECU 6 and the AT ECU 8 respectively control the engine 2 and the AT 4 which are the components of the vehicle drive system. The manager ECU 10 commands the operational guides (target engine torque and target shift stage) with respect to respective ECUs 6 and 8 for controlling the engine 2 and the AT 4. As a result, respective ECUs 6, 8 and 10 constituting the system can be designed independently from one another.

Further, the engine ECU 6 and the AT ECU 8 transmit the characteristic information of the engine 2 and the AT 4 to the manager ECU 10. The manager ECU 10 sets the control rules utilized for setting the operational guides with respect to the engine ECU 6 and the AT ECU 8 on the basis of the characteristic information. Thus, the manager ECU 10 can optimally control the engine 2 and the AT 4 via the engine ECU 6 and the AT ECU 8, respectively. Thus, the behavior of the entire power train can be controlled in a desirable state.

With regard to the control rules used when the engine ECU 6 and the AT ECU 8 control the engine 2 and the AT 4, a plurality of pieces of them corresponding to the tuning pattern set in advance are set. By selecting the tuning pattern on the side of the manager ECU 10, the control rules which are utilized for the control by the engine ECU 6 and the AT ECU 8 are constituted to be changeable. Thus, the tuning patterns of the engine 2 and the AT 4 can be made optimum pattern suited to the specifications of a vehicle in which the corresponding systems are incorporated.

In order to make control characteristics for respective ECU 6, 8 and 10 optimally compatible with one another within the entire power train, system designers are not necessitated to input the parameter for adaptation to respective ECUs. The control characteristics can automatically be agreed with one another by the communication among the ECUs, and a design period of the entire system can be considerably shortened.

Further, for example, in a case where an engine mounted on a vehicle is changed according to the design change or the like, through changing the engine ECU 6 corresponding to the engine, the control rules utilized at respective ECU for the control are automatically set to the optimum control rules by the communication between the manager ECU. Thus, the engine ECU can simply be set to correspond to the request of the design change.

In order to prevent the shift dead-time characteristic or the required shift time characteristic utilized for the control from becoming unable to correspond to the actual characteristics of the transmission due to the change of the elapse of time of the transmission, these respective parameters are measured and the changes with the elapse of time of them are determined in the AT ECU 8. In case of the occurrence of the change with the elapse of time, the shift dead-time characteristic and the required shift time characteristic utilized for the control are updated. Thus, it is possible to prevent the control characteristic of the entire power train from becoming unable to match the actual operating state of the control object (AT 4), and can prevent a decrease in the control accuracy accompanied with the change with the elapse of time.

In the above embodiment, the processing of S560–S590 (FIG. 17) and the S660–S690 (FIG. 18) function to transmit the engine characteristic information and the AT characteristic information to the manager ECU 10. The processing of S160–S180 and S280–S300 (FIG. 12) function to transmit the tuning selection information of the engine 2 and the AT 4 with respect to the engine ECU 6 and the AT ECU 8. The processing of S520–S550 (FIG. 17) and S620–S550 (FIG. 18) function to transmit the tuning freedom degree information of the engine 2 or the AT 4 to the manager ECU 10.

In the above embodiment various modifications can be made. For example, the manager ECU 10 side may well to be devised to control the behavior of the entire vehicle including even the brake system not merely the drive system of a vehicle by connecting an electronic control unit for controlling a brake system provided for respective wheels of a vehicle in addition to the engine ECU 6 and the AT ECU 8. Further, by connecting all sorts of information systems such as a navigation system or the like to the manager ECU 10, the drive system and the brake system of a vehicle may well be integratedly controlled in such a manner that the manager ECU 10 retrieves the information such as gradient and altitude of a road where a vehicle is traveling at present from these information systems and the drive torque of the drive wheel or the brake torque applied to respective wheels in braking time become the optimum.

What is claimed is:

1. An integrated vehicle control system comprising:

a plurality of component control sections respectively controlling operations of a plurality of components of a vehicle following previously set control rules; and a manager control section commanding operational guides of the components controlled by the component control sections to the component control sections;

wherein each of the component control sections includes characteristic information transmitting means for transmitting characteristic information of the components controlled by the component control sections to the manager control section;

wherein the manager control section sets the operational guides of the components based on the characteristic information of the components transmitted from the characteristic information transmitting means;

wherein the component control sections include a transmission control section for controlling a transmission;

wherein the characteristic information transmitting means of the transmission control section transmits to the manager control section, as the characteristic information of the transmission, at least one of a transmission characteristic, a shift prohibition/permission characteristic and a shift quality characteristic of the transmission; and wherein the transmission characteristic of the transmission includes at least one of torque amplification factor information, transmission efficiency information and transmittable torque information.

2. An integrated vehicle control system according to claim 1, wherein:

the characteristic information transmitting means transmits the characteristic information to the manager control section in a case where the manager control section does not have the characteristic information of the components.

3. An integrated vehicle control system according to claim 1, wherein:

the characteristic information transmitting means transmits the characteristic information to the manager control section in a case where the characteristic information of the components is changed.

4. An integrated vehicle control system according to claim 1, wherein:

the characteristic information transmitting means transmits the characteristic information of the components to the manager control section corresponding to a request from the manager control section.

5. An integrated vehicle control system according to claim 1, wherein:

the component control sections include an axle drive source control section for controlling an axle drive source; and the characteristic information transmitting means of the axle drive source control section transmits to the manager control section, as the characteristic information of the axle drive source, at least one of a generating drive power characteristic, a fuel consumption characteristic and an emission characteristic of the axle drive source.

6. An integrated vehicle control system according to claim 5, wherein:

the generating drive power characteristic of the axle drive source includes at least one of a drive power generation range according to an output shaft rotating speed of the axle drive source, a drive power response characteristic and a drive power accuracy characteristic.

7. An integrated vehicle control system according to claim 1 wherein:

the shift prohibition/permission characteristic of the transmission includes at least one of shift stage information capable or not capable of carrying out a shift with respect to shift stages set and the shift stage information capable or not capable of carrying out the shift with respect to a shift progressive situation.

8. An integrated vehicle control system according to claim 1 wherein:

the shift quality characteristic of the transmission includes at least one of required shift time information, shift dead-time information, rotating speed gradient information of a transmission input shaft and shift shock information.

9. An integrated vehicle control system comprising:

a plurality of component control sections respectively controlling operations of a plurality of components of a vehicle following previously set control rules; and a manager control section commanding operational guides of the components controlled by the component control sections to the component control sections;

wherein each of the component control sections includes characteristic information transmitting means for transmitting characteristic information of the components controlled by the component control sections to the manager control section;

wherein the manager control section sets the operational guides of the components based on the characteristic information of the components transmitted from the characteristic information transmitting means;

wherein at least one of the component control sections has a plurality of control rules for controlling the components by different tuning patterns;

wherein the manager control section has tuning selection information transmitting means for transmitting tuning selection information for designating the control rules utilized for controlling the components with respect to the component control sections having the plurality of control rules;

wherein the component control sections receiving the tuning selection information from the manager control sections follow the tuning selection information and sets the control rules utilized for controlling the components; and wherein the characteristic information transmitting means of the component control sections transmit the characteristic information of the components when controlling the components following the set control rules.

10. An integrated vehicle control system according to claim 9, wherein:

the tuning selection information transmitting means transmits the tuning selection information with respect to the component control sections in a case where the component control sections do not have the tuning selection information.

11. An integrated vehicle control system according to claim 9, wherein:

the tuning selection information transmitting means transmits the tuning selection information to the component control sections in a case where the tuning selection information is changed.

12. An integrated vehicle control system according to claim 9, wherein:

the manager control section transmits the tuning selection information to the component control sections according to a request from the component control sections.

13. An integrated vehicle control system according to claim 9, wherein:

the component control sections having the plurality of control rules include tuning freedom degree information transmitting means for transmitting to the manager control section tuning freedom degree information representing capability of changing settings of the tuning patterns of the components by the plurality of control rules; and the tuning selection information transmitting means of the manager control section sets the tuning selection information transmitted to the component control sections on the basis of the tuning freedom degree information transmitted from the tuning freedom degree information transmitting means of the component control sections.

14. An integrated vehicle control system according to claim 9, wherein:

the component control sections having the plurality of control rules include an axle drive source control section for controlling an axle drive source; and the manager control section sets the tuning patterns of the axle drive source by transmitting the tuning selection information from the tuning selection information transmitting means to the axle drive source control section.

15. An integrated vehicle control system according to claim 14, wherein:

the axle drive source control section is capable of changing generation drive power characteristic, a fuel consumption characteristic and an emission characteristic of the axle drive source by the plurality of control rules.

16. An integrated vehicle control system according to claim 9, wherein:

the component control sections having the plurality of control rules include a transmission control section for controlling a transmission; and the manager control section sets the tuning patterns of the transmission by transmitting the tuning selection information to the transmission control section from the tuning selection information transmitting means.

17. An integrated vehicle control system according to claim 16, wherein:

the transmission control section is capable of changing the transmission characteristic, the shift permission/prohibition characteristic and the shift quality characteristic of the transmission by the plurality of control rules.

18. An integrated vehicle control system according to claim 9 wherein:

the component control sections include an axle drive source control section for controlling an axle drive source; and the manager control section transmits a generation torque of the axle drive source as an operational guide to the axle drive source control section.

19. An integrated vehicle control system according to claim 9 wherein:

the component control sections include a transmission control section for controlling a transmission; and the manager control section transmits a transmission gear ratio of the transmission as an operational guide to the transmission control section.

20. An integrated vehicle control system according to claim 9 wherein:

the component control sections include a transmission control section for controlling a transmission; and the manager control section transmits a shift quality of the transmission as an operational guide to the transmission control section.

21. An integrated vehicle control system according to claim 9 wherein:

the manager control section and the plurality of component control sections are respectively constituted by independent electronic control units constituted of microcomputers; and the control sections are connected to each other by a data communication line.

22. An integrated vehicle control system comprising:

a plurality of component control sections respectively controlling operations of a plurality of components of a vehicle following previously set control rules; and a manager control section commanding operational guides of the components controlled by the component control sections to the component control sections;

wherein each of the component control sections includes characteristic information transmitting means for transmitting characteristic information of the components controlled by the component control sections to the manager control section;

wherein the manager control section sets the operational guides of the components based on the characteristic information of the components transmitted from the characteristic information transmitting means;

wherein the manager control section and the plurality of component control sections are respectively constituted by independent electronic control units constituted of microcomputers; and the control sections are connected to each other by a data communication line; and wherein the characteristic information transmitting means and the tuning freedom degree information transmitting means provided in the component control sections transmits to the manager control section the characteristic information of the components and the tuning freedom degree information, when connected to the manager control section via the communication line.

23. An integrated vehicle control system comprising:

a plurality of component control sections respectively controlling operations of a plurality of components of a vehicle following previously set control rules; and a manager control section commanding operational guides of the components controlled by the component control sections to the component control sections;

wherein each of the component control sections includes characteristic information transmitting means for transmitting characteristic information of the components controlled by the component control sections to the manager control section;

wherein the manager control section sets the operational guides of the components based on the characteristic information of the components transmitted from the characteristic information transmitting means;

wherein the component control sections include an axle drive source control section for controlling an axle drive source; and wherein the characteristic information transmitting means of the axle drive source control section transmits to the manager control section, as the characteristic information of the axle drive source, at least one of a generating drive power characteristic, a fuel consumption characteristic and an emission characteristic of the axle drive source.

24. An integrated vehicle control system according to claim 23 wherein:

the generating drive power characteristic of the axle drive source includes at least one of a drive power generation range according to an output shaft rotating speed of the axle drive source, a drive power response characteristic and a drive power accuracy characteristic.

25. An integrated vehicle control system comprising:

an axle drive source control section for controlling an axle drive source;

a transmission control section for controlling a transmission; and a manager control section commanding operational guides of the axle drive source and the transmission, wherein the axle drive source control section and the transmission control section includes characteristic information transmitting means for transmitting characteristic information of the axle drive source and the transmission to the manager control section, respectively.

26. An integrated vehicle control system comprising:

a first ECU directly controlling a first vehicle component;

a second ECU directly controlling a second vehicle component; and a manager ECU connected for bi-directional data communication with said first and second ECUs and adapted to indirectly control said first and second vehicle components via said first and second ECUs.

27. A method for integrated vehicle control, said method comprising:

directly controlling a first vehicle component with a first ECU;

directly controlling a second vehicle component with a second ECU;

managing the operations of said first and second ECUs with a manager ECU connected for bi-directional data communication with said first and second ECUs and thereby indirectly controlling said first and second vehicle components via said first and second ECUs.

* * * * *